(12) United States Patent
Gwon et al.

(10) Patent No.: US 12,411,371 B2
(45) Date of Patent: Sep. 9, 2025

(54) DISPLAY DEVICE HAVING SWITCHABLE VIEWING ANGLE

(71) Applicant: LG Display Co., Ltd., Seoul (KR)

(72) Inventors: SeungJu Gwon, Paju-si (KR); JaeJung Han, Incheon (KR); HyukJoon Yoon, Paju-si (KR); SeMin Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/676,019

(22) Filed: May 28, 2024

(65) Prior Publication Data

US 2025/0028196 A1 Jan. 23, 2025

(30) Foreign Application Priority Data

Jul. 20, 2023 (KR) ........................ 10-2023-0094605

(51) Int. Cl.
*G02F 1/13* (2006.01)
*G02F 1/1335* (2006.01)
*G02F 1/13363* (2006.01)
*G02F 1/1343* (2006.01)

(52) U.S. Cl.
CPC ...... *G02F 1/1323* (2013.01); *G02F 1/133526* (2013.01); *G02F 1/133531* (2021.01); *G02F 1/133638* (2021.01); *G02F 1/134309* (2013.01)

(58) Field of Classification Search
CPC . G02F 1/1323; G02F 1/1347; G02F 1/133526
See application file for complete search history.

(56) References Cited

U.S. PATENT DOCUMENTS

| 2007/0047214 A1* | 3/2007 | Nesterenko ......... G02F 1/13362 362/19 |
| 2010/0128200 A1* | 5/2010 | Morishita ........... G02F 1/13363 349/62 |
| 2017/0219859 A1* | 8/2017 | Christophy ............... G02F 1/29 |
| 2018/0113335 A1* | 4/2018 | Jin ........................ G02F 1/1334 |
| 2021/0088838 A1* | 3/2021 | Liu ..................... G02F 1/13338 |
| 2022/0077431 A1 | 3/2022 | Lee et al. |

FOREIGN PATENT DOCUMENTS

| CN | 1291729 A | * | 4/2001 | .......... G02B 6/0053 |
| JP | 2018136494 A | * | 8/2018 | .......... G02F 1/1323 |
| KR | 10-2013-0067339 A | | 6/2013 | |
| KR | 10-2022-0033770 A | | 3/2022 | |
| WO | WO-2017203809 A1 | * | 11/2017 | ............... G02F 1/13 |

* cited by examiner

*Primary Examiner* — Jessica M Merlin
(74) *Attorney, Agent, or Firm* — Fenwick & West LLP

(57) ABSTRACT

A display device having a switchable viewing angle includes a first polarizer which transmits light of a P-wave or S-wave, a viewing angle control panel which is disposed above the first polarizer, includes a lower electrode and an upper electrode, and a liquid crystal layer disposed between the lower electrode and the upper electrode to selectively change the light of P-wave or S-wave to an S-wave or P-wave, and a second polarizer which is disposed above the viewing angle control panel and has a transmission axis perpendicular to a transmission axis of the first polarizer. Therefore, the mode may be switchable to the privacy mode and the share mode and in the share mode, the luminance may be improved without increasing the power consumption.

11 Claims, 21 Drawing Sheets

DISPLAY DEVICE HAVING SWITCHABLE VIEWING ANGLE

CROSS-REFERENCE TO RELATED APPLICATION

This application claims the priority of Republic of Korea Patent Application No. 10-2023-0094605 filed on Jul. 20, 2023, in the Korean Intellectual Property Office, which is hereby incorporated by reference in its entirety.

BACKGROUND

Field

The present disclosure relates to a display device having a switchable viewing angle.

Description of the Related Art

Generally, display devices are widely used as display screens for various products, such as televisions, laptops, monitors, and bank automated teller machines (ATMs), as well as portable electronic devices, such as mobile communication terminals, electronic notebooks, e-books, portable multimedia players (PMP), navigations, ultra-mobile PCs (UMPC), mobile phones, smart phones, and tablet PCs.

A viewing angle characteristic is very important for the display device.

The display device should produce clear and undistorted image quality even in a wide viewing angle range. Therefore, a wide viewing angle technique is consistently being developed.

However, if it is desired that information displayed through the display device is not visible to others nearby, in addition to the wide-angle mode (normal mode), a narrow viewing angle mode (privacy mode) which allows images on the screen to be seen by only people sitting in front of the screen is also required when working with confidential documents or performing tasks which require security.

SUMMARY

An object to be achieved by the present disclosure is to provide a display device having a switchable viewing angle in which a privacy mode and a normal mode (or a share mode) can be switched and specifically, in the share mode, the luminance is improved without increasing power consumption.

Another object to be achieved by the present disclosure is to provide a display device having a switchable viewing angle in which a switching speed between a privacy mode and a share mode is improved.

Another object to be achieved by the present disclosure is to provide a display device having a switchable viewing angle in which efficiency and fairness are improved.

Objects of the present disclosure are not limited to the above-mentioned objects, and other objects, which are not mentioned above, can be clearly understood by those skilled in the art from the following descriptions.

According to an embodiment of the present disclosure, a display device having a switchable viewing angle includes a first polarizer which transmits light of a P-wave or S-wave, a viewing angle control panel which is disposed above the first polarizer, includes a lower electrode and an upper electrode, and a liquid crystal layer disposed between the lower electrode and the upper electrode to selectively change the light of P-wave or S-wave to an S-wave or P-wave and a second polarizer which is disposed above the viewing angle control panel and has a transmission axis perpendicular to a transmission axis of the first polarizer.

According to another embodiment of the present disclosure, a display device having a switchable viewing angle includes a first polarizer which transmits light of a P-wave or S-wave, a viewing angle control panel which is disposed above the first polarizer, includes a lower electrode and an upper electrode, and a liquid crystal layer disposed between the lower electrode and the upper electrode to selectively change the light of P-wave or S-wave to an S-wave or P-wave, a third polarizer which is disposed above the viewing angle control panel and has a transmission axis perpendicular to a transmission axis of the first polarizer, a first substrate disposed above the third polarizer, a second substrate which is opposite to the first substrate, another liquid crystal layer disposed between the first substrate and the second substrate and a fourth polarizer which is disposed at the outside of the second substrate and has a transmission axis perpendicular to a transmission axis of the third polarizer.

Other detailed matters of the exemplary embodiments are included in the detailed description and the drawings.

The present disclosure may provide the display device having a switchable viewing angle in which a polarized state of a light source and a light path are controlled to switch the privacy mode and the share mode and the luminance is improved without increasing power consumption in the share mode.

The present disclosure provides a display device having a switchable viewing angle in which a twisted nematic (TN) liquid crystal with a fast response speed to control the light path is used to improve the switching speed between the privacy mode and the share mode.

The present disclosure provides a display device having a switchable viewing angle in which light is condensed using a pixel lens and glass is used as a base substrate to improve the efficiency and the fairness.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
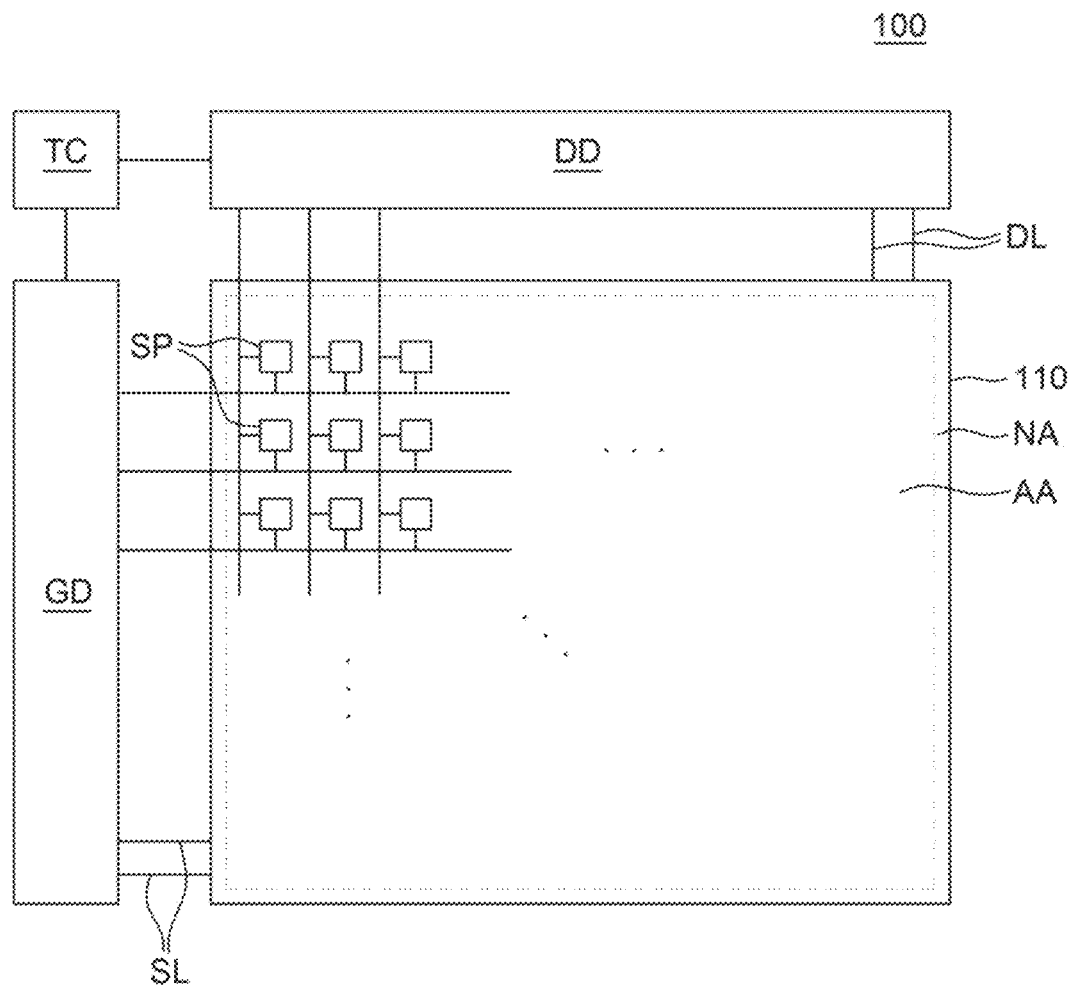
FIG. 1 is a diagram schematically illustrating a display device having a switchable viewing angle according to various exemplary embodiments of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, an exemplary embodiment of the present disclosure will be described in detail with reference to the drawings.

FIG. 1 is a diagram schematically illustrating a display device having a switchable viewing angle according to various exemplary embodiments of the present disclosure.

Figure 2:
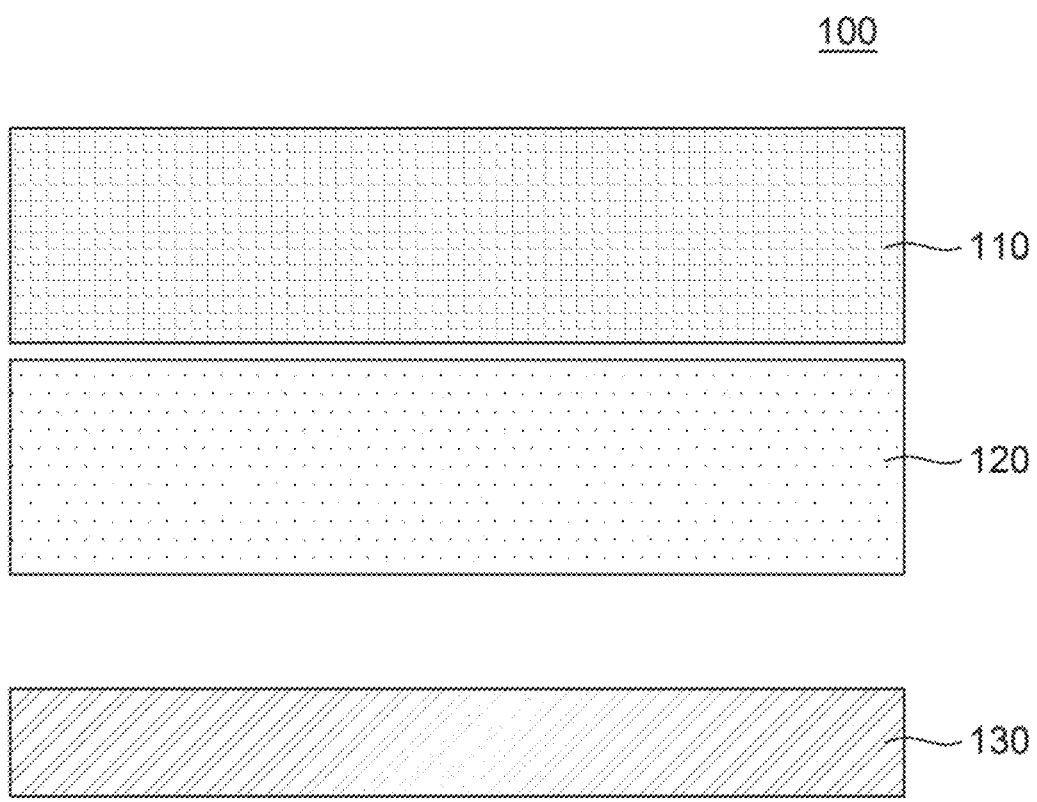
FIG. 2 is a view illustrating a display device having a switchable viewing angle according to various exemplary embodiments of the present disclosure.

FIG. 2 is a view illustrating a display device having a switchable viewing angle according to various exemplary embodiments of the present disclosure.

In FIG. 1, for the convenience of description, among various components of the display device 100 with a switchable viewing angle, a display panel 110, a gate driver GD, a data driver DD, and a timing controller TC are illustrated.

Referring to FIG. 1, the display device 100 with a switchable viewing angle according to exemplary embodiments of the present disclosure may include a display panel 110 including a plurality of sub pixels SP, a gate driver GD and a data driver DD which supply various signals to the display panel 110, and a timing controller TC.

The gate driver GD may supply a plurality of scan signals to a plurality of scan lines SL in accordance with a plurality of gate control signals supplied from the timing controller TC. Even though in FIG. 1, it is illustrated that one gate driver GD is disposed to be spaced apart from one side of the display panel 110, the number of the gate drivers GD and the placement thereof are not limited thereto.

The data driver DD may convert image data input from the timing controller TC into a data voltage using a reference gamma voltage in accordance with a plurality of data control signals supplied from the timing controller TC. The data driver DD may supply the converted data voltage to the plurality of data lines DL.

The timing controller TC aligns image data input from the outside to supply the image data to the data driver DD. The timing controller TC may generate a gate control signal and a data control signal using synchronization signals input from the outside, such as a dot clock signal, a data enable signal, and horizontal/vertical synchronization signals. The timing controller TC supplies the generated gate control signal and data control signal to the gate driver GD and the data driver DD, respectively, to control the gate driver GD and the data driver DD.

The display panel 110 is a configuration which displays images to the user and may include the plurality of sub pixels SP. In the display panel 110, the plurality of scan lines SL and the plurality of data lines DL intersect each other and the plurality of sub pixels SP may be connected to the scan lines SL and the data lines DL, respectively. In addition, each of the plurality of sub pixels SP may be connected to a high potential power line, a low potential power line, or a reference line, but is not limited thereto.

In the display panel 110, an active area AA and the non-active area NA enclosing the active area AA may be defined.

The active area AA is an area where images are displayed in the display panel 110.

In the active area AA, a plurality of sub pixels SP which configures a plurality of pixels and a circuit for driving the plurality of sub pixels SP may be disposed. The plurality of sub pixels SP is a minimum unit which configures the active area AA and n sub pixels SP may form one pixel. As the display panel 110 used for the exemplary embodiments of the present disclosure, all types of display panels, such as a liquid crystal display panel, an organic electroluminescent display panel, a quantum dot display panel, and an electroluminescent display panel may be used.

In the active area AA, a plurality of wiring lines which transmit various signals to the plurality of sub pixels SP may be disposed. For example, the plurality of wiring lines includes a plurality of data lines DL which supply a data voltage to each of the plurality of sub pixels SP, a plurality of scan lines SL which supply a scan signal to each of the plurality of sub pixels SP, and the like. The plurality of scan lines SL extend to one direction in the active area AA to be connected to the plurality of sub pixels SP and the plurality of data lines DL extend to a direction different from the one direction in the active area AA to be connected to the plurality of sub pixels SP. In addition, in the active area AA, a low potential power line, a high potential power line, and the like may be further disposed, but are not limited thereto.

The non-active area NA is an area where no image is displayed. The non-active area NA may be defined as an area extending from the active area AA. In the non-active area NA, a link line which transmits a signal to the sub pixel SP of the active area AA, a pad electrode, a driving IC, such as a gate driver IC or a data driver IC, or the like, may be disposed.

However, the non-active area NA may be located on a rear surface of the display panel 110, that is, a surface on which the sub pixels SP are not disposed or may be omitted, and is not limited as illustrated in the drawing.

In the meantime, a driver, such as a gate driver GD, a data driver DD, and a timing controller TC, may be connected to the display panel 110 in various ways. For example, the gate driver GD may be mounted in the non-active area NA, in the gate in panel (GIP) manner. Further, the data driver DD and the timing controller TC are formed in separate flexible film and printed circuit board. The data driver DD and the timing controller TC may be electrically connected to the display panel 110 by bonding the flexible film and the printed circuit board to the pad electrode formed in the non-active area NA of the display panel 110.

In the meantime, referring to FIG. 2, the display device 100 with a switchable viewing angle of the present disclosure may largely include a display panel 110 which displays images, a viewing angle control panel 120, and a backlight unit 130 which is disposed below the viewing angle control panel 120. The viewing angle control panel 120 is disposed above or below the display panel 110 to selectively control a viewing angle range at which the image produced by the display panel 110 is displayed.

Even though in FIG. 2, it is illustrated that the viewing angle control panel 120 is disposed below the display panel 110, it is not limited thereto and the viewing angle control panel 120 may be disposed above the display panel 110.

In the meantime, for example, when the display panel 110 is configured as a liquid crystal display panel, the display panel 110 may include a first substrate, a second substrate, and a liquid crystal layer interposed between the first substrate and the second substrate.

Even though it is not illustrated, the first substrate which is a TFT array substrate may include a gate line and a data line which intersect to define a pixel area and a thin film transistor formed at the intersection of the gate line and the data line.

Further, for example, in the pixel area of the first substrate, a plurality of common electrodes and a plurality of pixel electrodes are alternately disposed to produce an image.

Further, on the second substrate which is a color filter substrate, a black matrix having an opening corresponding to each pixel area is disposed and a color filter layer including red, green, and blue color filters which are sequentially and repeatedly disposed to correspond to the opening may be disposed.

An overcoat layer may be disposed above the black matrix and the color filter layer.

Further, a lower polarizer and an upper polarizer which selectively transmit specific light may be attached to outer surfaces of the first substrate and the second substrate, respectively. For the convenience of description, the lower polarizer and the upper polarizer may be referred to as a third polarizer and a fourth polarizer.

At this time, polarization axes of the third polarizer and the fourth polarizer may be orthogonal to each other.

In the meantime, the viewing angle control panel 120 may be disposed above or below the display panel 110. For example, the viewing angle control panel 120 of the present disclosure largely includes a viewing angle control layer and polarizers disposed above and below the viewing angle control layer. The viewing angle control panel 120 may selectively provide light appropriate for the privacy mode or the share mode by controlling a polarized state of light for every area depending on whether a voltage is applied to an electrode provided in the viewing angle control layer.

Further, the backlight unit 130 may be disposed below the viewing angle control panel 120. For example, the backlight unit 130 of the present disclosure may provide polarized (for example, a P-wave or an S-wave) light.

The backlight unit 130 includes a light source such as an incandescent lamp, a fluorescent lamp, or a light emitting diode LED and light emitted from the light source is provided to the display panel 110 via the viewing angle control panel 120 to produce an image.

Hereinafter, the viewing angle control panel 120 and the backlight unit 130 will be described in detail with reference to FIGS. 3A, 3B, 4A and 4B.

Figure 3A:
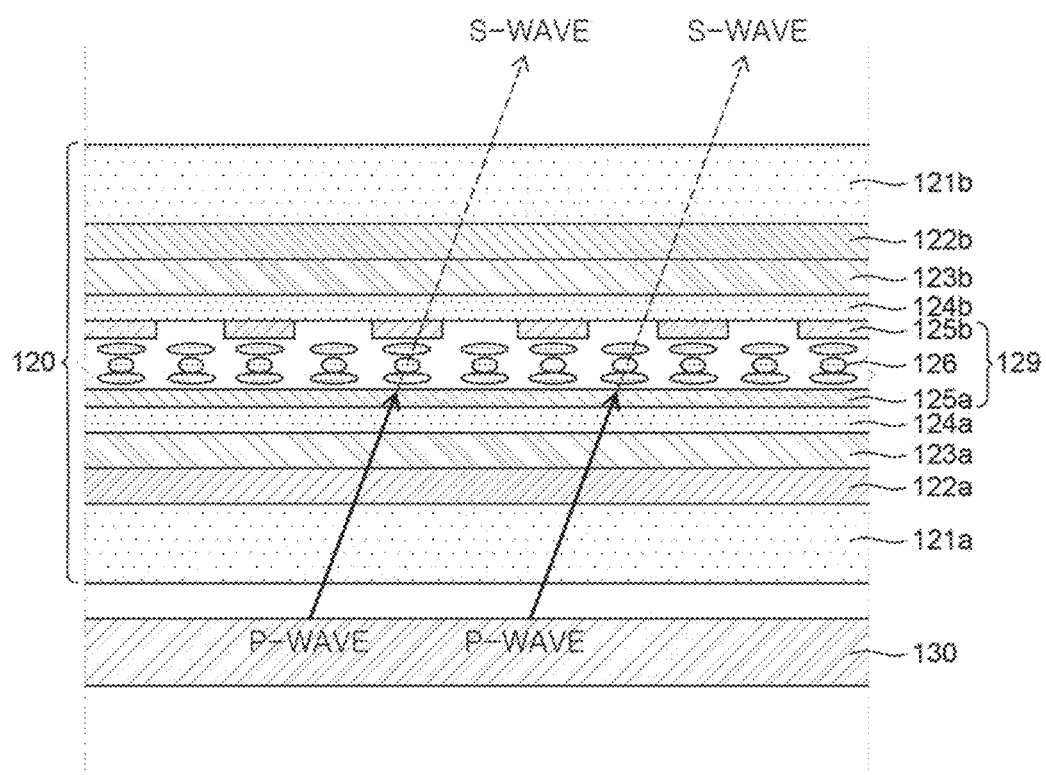
FIGS. 3A and 3B are cross-sectional views illustrating a part of a display device having a switchable viewing angle according to a first exemplary embodiment of the present disclosure.
Figure 3B:
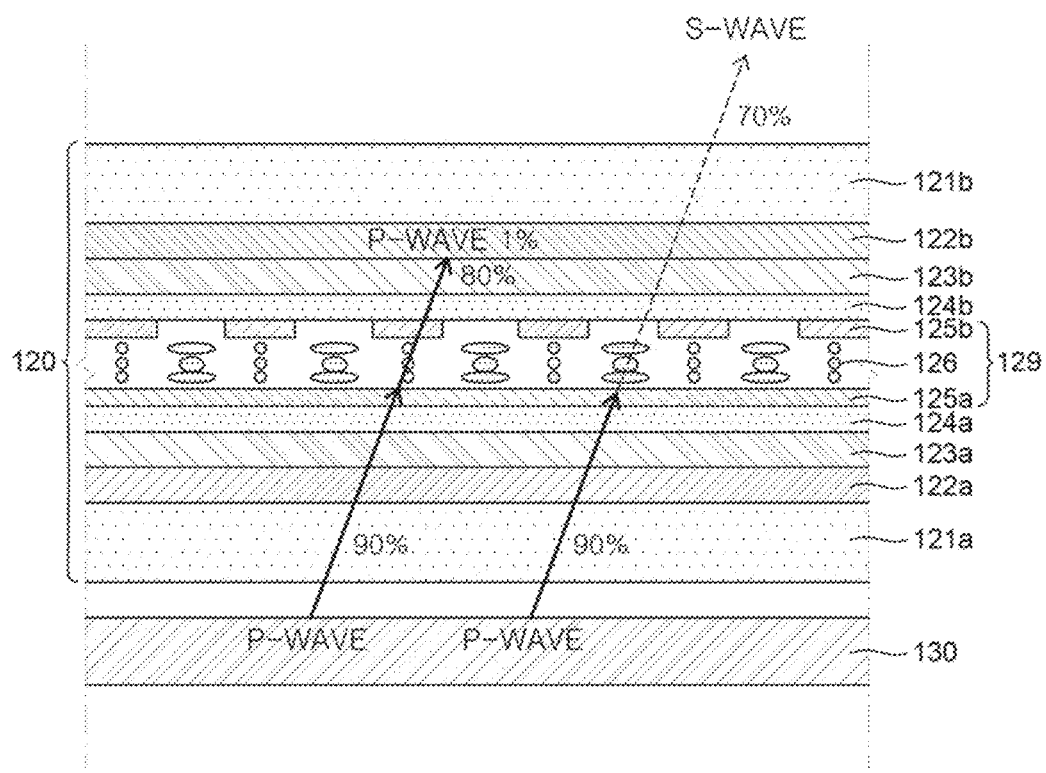

FIGS. 3A and 3B are cross-sectional views illustrating a part of a display device having a switchable viewing angle according to a first exemplary embodiment of the present disclosure.

Figure 4A:
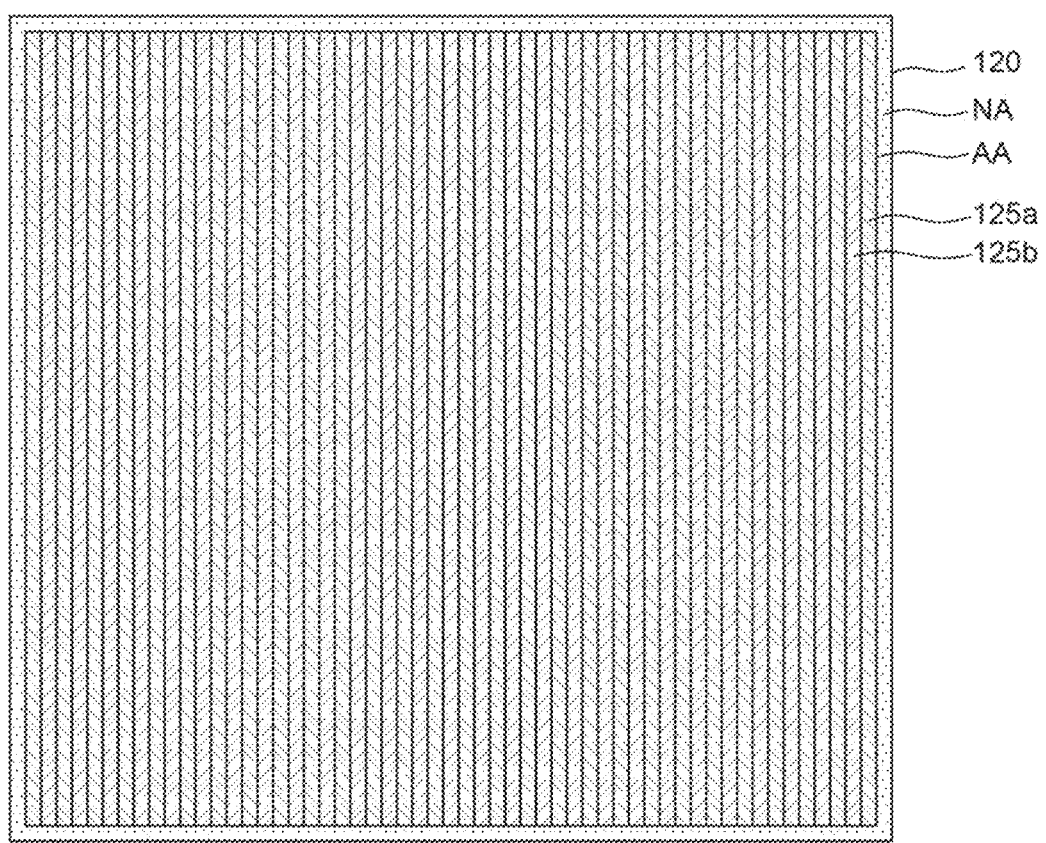
FIGS. 4A and 4B are plan views illustrating a part of a display device having a switchable viewing angle according to a first exemplary embodiment of the present disclosure.
Figure 4B:
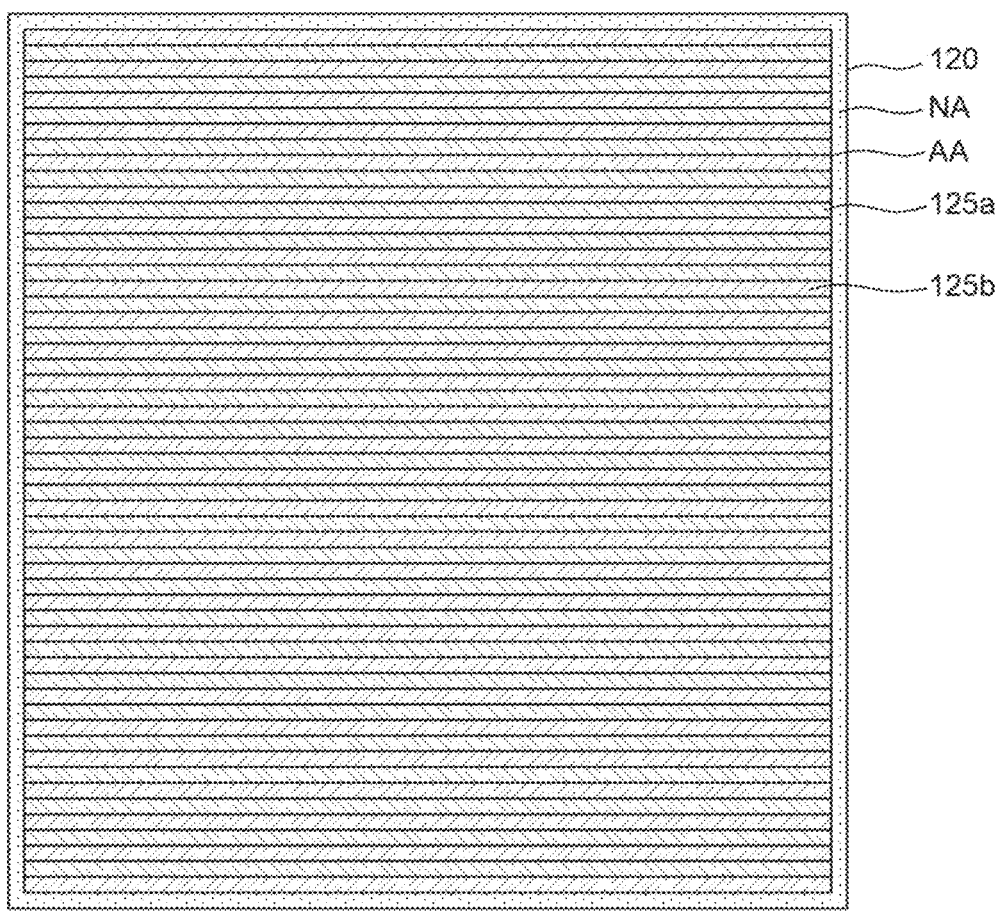

FIGS. 4A and 4B are plan views illustrating a part of a display device having a switchable viewing angle according to a first exemplary embodiment of the present disclosure.

FIGS. 3A and 3B illustrate structures of a viewing angle control panel 120 and a backlight unit 130 according to the first exemplary embodiment of the present disclosure.

For the convenience of description, FIGS. 3A and 3B illustrate a part of the display device having a switchable viewing angle in which the display panel is omitted and the display panel may be disposed above or below the viewing angle control panel 120 or attached in the add-on manner.

FIG. 3A illustrates a display device having a switchable viewing angle in which the voltage is not applied to one pair of electrodes 125*a* and 125*b* and FIG. 3B illustrates a display device having a switchable viewing angle in which the voltage is applied to one pair of electrodes 125*a* and 125*b*.

FIGS. 3A and 3B illustrate a change in a polarized state of light depending on whether to apply a voltage.

Further, FIGS. 4A and 4B illustrate placement of one pair of electrodes 125*a* and 125*b*.

Referring to FIGS. 3A, 3B, 4A, and 4B, the backlight unit 130 may be disposed below the viewing angle control panel 120.

The backlight unit 130 according to the first exemplary embodiment of the present disclosure applies a polarization light source to supply light polarized to, for example, a P wave or S wave.

According to the related art, un-polarized light which is emitted from the light source is primarily polarized using the lower polarizer and a direction of the polarized light is controlled using the liquid crystal layer, and the light is secondarily polarized using the upper polarizer to produce an image. As described above, according to the related art, light which is primarily polarized using the lower polarizer is used so that most (about 50%) of the light emitted from the light source is shielded by the lower polarizer to be lost. As the light passes through various films including the polarizer and many layers, light which produces the final image does not reach even 10% of the total light.

In the meantime, a reflective polarizer DBEF film (Vikuiti™ DBEF) which reduces light loss to reduce the entire power consumption is developed and used. The reflective polarizer DBEF (dual brightness enhancement film) film passes a polarized wave (for example, a P wave) in one direction and reflects a polarized wave (for example, an S wave) in the other direction, among light incident onto the DBEF film. Further, light reflected from the reflective polarizer DBEF is re-reflected from the reflective film and the DBEF film passes a polarized wave in one direction, of the re-reflected light, and reflects a polarized wave in the other direction again. That is, the reflective polarizer DBEF film increases the availability of light using both the reflection and polarization. However, when the light is reflected, light loss is caused so that the DBEF film has a limitation in reducing the light loss. Further, the reflective polarizer DBEF film has a disadvantage of a high manufacturing cost.

Therefore, a first exemplary embodiment of the present disclosure uses a backlight unit 130 to which a polarization light source is applied to reduce the light loss and reduce the total power consumption of the display device having a switchable viewing angle. Further, the image can be produced without using the lower polarizer film and/or the reflective polarizer DBEF film, which may reduce a cost.

For example, the backlight unit 130 may include a nonpolar LED as a light source. Further, the backlight unit 130 may further include a diffusion plate which mixes light emitted from the light source and a brightness enhancement film (BEF), but it is not limited thereto.

For example, the LED is aligned above a substrate, such as a printed circuit board, to form an array and may include red, green, and blue LEDs or a white LED. The LEDs are regularly disposed above the printed circuit board to configure an LED module and a plurality of LED modules may also be used to supply the light to the viewing angle control panel 120. For example, a reflective film is located below a light exit surface of the LED to reflect light emitted from the LED upwardly. Further, the LED may be provided as a package in which a non-polar light emitting diode chip is mounted.

Light which is emitted from the LED and then polarized to the P-wave or the S-wave which passes through the diffusion plate and the BEF is incident onto the viewing angle control panel 120. In FIGS. 3A and 3B, it is illustrated that light which is polarized to the P-wave is incident onto the viewing angle control panel 120 as an example, but the present disclosure is not limited thereto so that the light which is polarized to the S-wave may be incident onto the viewing angle control panel 120.

Generally, a polarization degree of 98% to 100% is required for the polarizer used for the liquid crystal display panel so that the transmittance does not exceed approximately 40 to 50%. However, in the present disclosure, for example, a polarizer with a polarization degree of 70% to 90% and a transmittance of 60% to 80% may be used as the first polarizer 122*a* of the viewing angle control panel 120.

Next, the viewing angle control panel 120 according to the first exemplary embodiment of the present disclosure may largely include a viewing angle control layer 129, and a first polarizer 122*a* and a second polarizer 122*b* which are disposed below and above the viewing angle control layer 129, respectively.

For example, the first polarizer 122*a* may have a transmission axis which matches a polarization direction of the backlight light. For example, when the backlight light has a horizontal polarization of the P-wave, the first polarizer 122*a* may have a transmission axis of 0° and an absorption axis of 90°.

For example, the second polarizer 122*b* may have a transmission axis which is perpendicular to a polarization direction of the backlight light. For example, when the backlight light has a horizontal polarization of the P-wave, the second polarizer 122*b* may have a transmission axis of 90° and an absorption axis of 0°. That is, the transmission axis of the second polarizer 122*b* may be perpendicular to the transmission axis of the first polarizer 122*a*.

For reference, the polarizer has a polarization film having a polarizing function and the polarization film may be formed by adsorbing iodine or dichroic dyes on a polyvinyl alcohol (PVA) layer stretched in a specific direction. At this time, the transmission axis may be formed to be orthogonal to the stretching direction.

For example, a first tri acetate cellulose (TAC) layer 121*a* and a second TAC layer 121*b* may be disposed at the outsides of the first polarizer 122*a* and the second polarizer 122*b*, respectively. Further, an adhesive layer may be further disposed at the outside of the second TAC layer 121*b*. The adhesive layer may be a layer formed by an adhesive agent which bonds the viewing angle control panel 120 to the display panel. For example, the adhesive layer may include a pressure sensitive adhesive (PSA).

For example, a first phase delay compensation film 123*a* of ORT may be disposed between the first polarizer 122*a* and the viewing angle control layer 129, but is not limited thereto and may be omitted if necessary.

For example, a first protective layer 124a may be disposed between the first phase delay compensation film 123a and the viewing angle control layer 129, but is not limited thereto and may be omitted if necessary. For example, the first protective layer 124a may be formed of silicon nitride having a water vapor transmission rate (WVTR) of $10^{-3}$ to $10^{-2}$ g/m$^2$·day to protect the lower electrode 125a from the moisture, but is not limited thereto.

For example, a second phase delay compensation film 123b of ORT may be disposed between the second polarizer 122b and the viewing angle control layer 129, but is not limited thereto and may be omitted if necessary.

For example, a second protective layer 124b may be disposed between the second phase delay compensation film 123b and the viewing angle control layer 129, but is not limited thereto and may be omitted if necessary. For example, the second protective layer 124b may be formed of silicon nitride having WVTR of $10^{-3}$ to $10^{-2}$ g/m$^2$·day to protect the upper electrode 125b from the moisture, but is not limited thereto.

The viewing angle control layer 129 may include a lower electrode 125a and an upper electrode 125b, and a liquid crystal layer 126 disposed between the lower electrode 125a and the upper electrode 125b.

At this time, for example, the lower electrode 125a may be configured as a whole electrode over the active area AA. For example, the lower electrode 125a extends to the non-active area NA to overlap a part of the non-active area NA.

In contrast, for example, the upper electrode 125b may be configured as a plurality of bars parallel in one direction over the active area AA. FIG. 4A illustrates that the upper electrode 125b is disposed to be parallel to the data line as an example and FIG. 4B illustrates that the upper electrode 125b is disposed to be parallel to the gate line as an example, but is not limited thereto. Here, the "parallel" direction may include not only the same direction, but also the substantially same direction, that is, the same direction in consideration of a process error. Further, when the upper electrode 125b is disposed to be parallel to the data line as illustrated in FIG. 4A, a privacy mode for the horizontal direction may be implemented and when the upper electrode 125b is disposed to be parallel to the gate line as illustrated in FIG. 4B, a privacy mode for the vertical direction may be implemented.

Further, for example, the upper electrode 125b may be configured as a plurality of bars which is parallel to each other with a regular interval.

The upper electrode 125b and the lower electrode 125a may be configured by a transparent conductive material with excellent transmission rate, for example, at least one of indium tin oxide (ITO), indium zinc oxide (IZO), carbon nanotubes, metal nanowires, and poly(3,4-ethylenedioxythiophene (PEDOT).

In the meantime, the liquid crystal layer 126 may be configured by twisted nematic (TN) liquid crystal with a fast response speed.

In the twisted nematic liquid crystal, molecules are disposed in a spiral shape, and the direction of the molecules rotates for each layer, which may form an overall rotated spiral structure.

Further, when the voltage is applied to the twisted nematic liquid crystal, rotation of the liquid crystal molecules changes and the rotation of the molecules may be used to control the light transmittance. For example, when the voltage is not applied, the light rotates due to the spiral structure and a traveling direction of the transmitted light may rotate.

Therefore, as illustrated in FIG. 3A, when the electric field is not applied between the upper electrode 125b and the lower electrode 125a, the state of the liquid crystal layer 126 is the same in all the areas of the viewing angle control layer 129.

In contrast, as illustrated in FIG. 3B, when the electric field is applied between the upper electrode 125b and the lower electrode 125a, the state of the liquid crystal layer 126 is different between an area where the upper electrode 125b is disposed and an area where the upper electrode 125b is not disposed.

First, when an electric field is not applied between the upper electrode 125b and the lower electrode 125a, referring to FIG. 3A, for example, the backlight light having a horizontal polarization of the P-wave is incident onto the viewing angle control panel 120.

In this case, the first polarizer 122a has the transmission axis which matches the polarization direction of the backlight light so that the backlight light of the P-wave may pass through the first polarizer 122a without causing the loss.

Further, in this case, the state of the liquid crystal layer 126 may be the same in all the areas of the viewing angle control layer 129. That is, as the liquid crystal molecules of the liquid crystal layer 126 spirally rotate, the traveling direction of light which passes through the first polarizer 122a rotates to change the polarization direction of the light of the P-wave to the S wave.

Further, in this case, the light whose polarization direction is changed to the S-wave may pass through the second polarizer 122b having a transmission axis which is perpendicular to the polarization direction of the backlight light without causing the loss.

Therefore, the light of the S-wave passes through the viewing angle control panel 120 in both the area in which the upper electrode 125b is disposed and the area in which the upper electrode 125b is not disposed to be provided to the display panel to implement a share mode.

Next, when the electric field is applied between the upper electrode 125b and the lower electrode 125a, referring to FIG. 3B, the backlight light having a horizontal polarization of the P-wave is incident onto the viewing angle control panel 120 as described above.

In this case, the first polarizer 122a has the transmission axis which matches the polarization direction of the backlight light so that the backlight light of the P-wave may pass through the first polarizer 122a without causing the loss.

In contrast, in this case, the state of the liquid crystal layer 126 may be different between the area in which the upper electrode 125b is disposed and the area in which the upper electrode 125b is not disposed. That is, as the spirally rotated state of the liquid crystal molecules of the liquid crystal layer 126 is maintained in the area in which the upper electrode 125b is not disposed, the traveling direction of light which passes through the first polarizer 122a rotates to change the polarization direction of the light of the P-wave to the S wave. In contrast, in the area in which the upper electrode 125b is disposed, the liquid crystal molecules of the liquid crystal layer 126 are rearranged by the electric field so that the spiral shape is unraveled and the liquid crystal molecules are aligned in one line. By doing this, the light of the P wave passes through the TN liquid crystal layer 126 without changing the polarized state.

Further, in this case, the light of the P-wave may not pass through the second polarizer 122b having a transmission axis which is perpendicular to the polarization direction of the backlight light.

Therefore, in the area in which the upper electrode 125b is not disposed, the light of the S-wave passes through the viewing angle control panel 120 to be supplied to the display panel. In contrast, in the area in which the upper electrode 125b is disposed, the light of the P-wave is blocked by the second polarizer 122b to implement the privacy mode.

For example, the backlight light of the P-wave is partially absorbed and approximately 90% thereof is transmitted while passing through the first polarizer 122a and is partially absorbed and approximately 80% thereof is transmitted while passing through the viewing angle control layer 129. Further, the light of the P-wave is partially absorbed and approximately 70% thereof is finally transmitted while passing through the second polarizer 122b. In contrast, the light of the S-wave is almost blocked by the second polarizer 122b and approximately 1% thereof may be transmitted.

In contrast, it is understood that in the case of a thin film shutter (TFS) using the un-polarized backlight light source and electrochromic (EC) of the related art, a significant amount of light is absorbed and only approximately 35% thereof is transmitted while passing through the electrochromic films. Accordingly, in the first exemplary embodiment of the present disclosure, it is expected that a viewing angle luminance will be improved by approximately 3.6 times compared to the related art.

As described above, the first exemplary embodiment of the present disclosure may provide the display device having a switchable viewing angle in which a polarized state of a backlight light source and a light path are controlled to switch the privacy mode and the share mode. Specifically, the luminance is improved without increasing power consumption in the share mode.

Further, the display device having a switchable viewing angle which uses the TN liquid crystal with the fast response speed to control the light path to improve the switching speed between the share mode and the privacy mode may be provided.

In the meantime, according to the present disclosure, a pixel lens is added on an upper layer of the viewing angle control panel to condense light to improve the efficiency, which will be described in more detail with reference to a second exemplary embodiment of the present disclosure.

Figure 5:
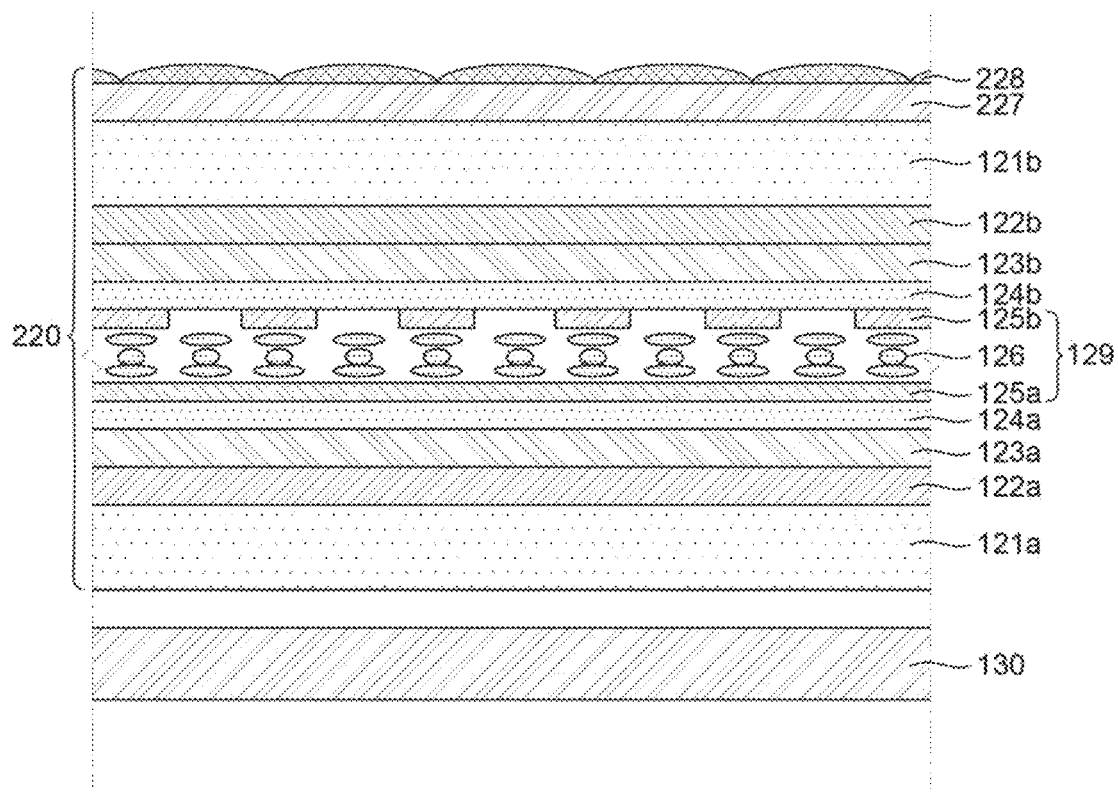
FIG. 5 is a cross-sectional view illustrating a part of a display device having a switchable viewing angle according to a second exemplary embodiment of the present disclosure.

FIG. 5 is a cross-sectional view illustrating a part of a display device having a switchable viewing angle according to a second exemplary embodiment of the present disclosure.

Figure 6A:
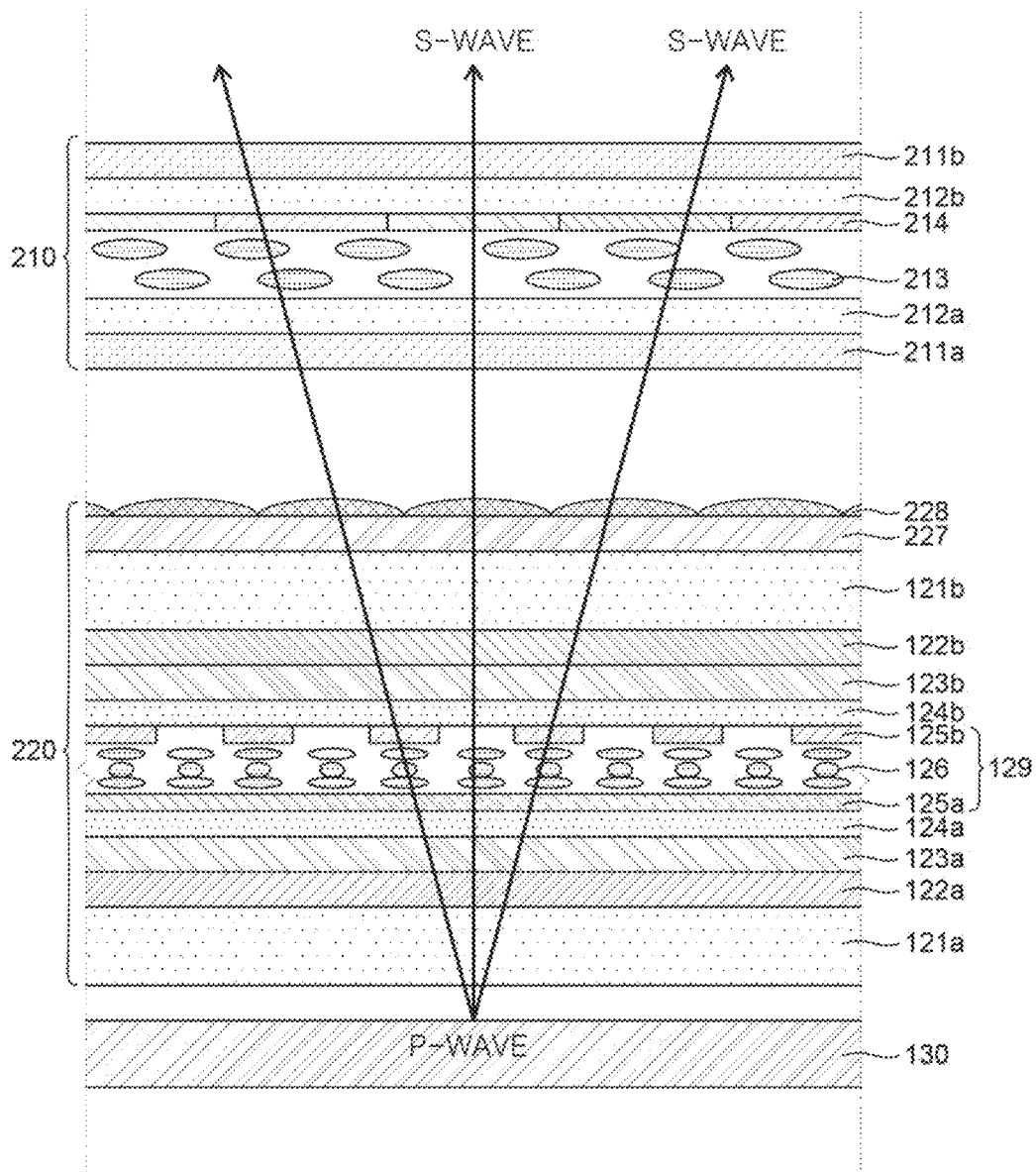
FIG. 6A is a view illustrating a share mode of a display device having a switchable viewing angle according to a second exemplary embodiment of the present disclosure.

FIG. 6A illustrates a share mode of a display device having a switchable viewing angle according to a second exemplary embodiment of the present disclosure.

Figure 6B:
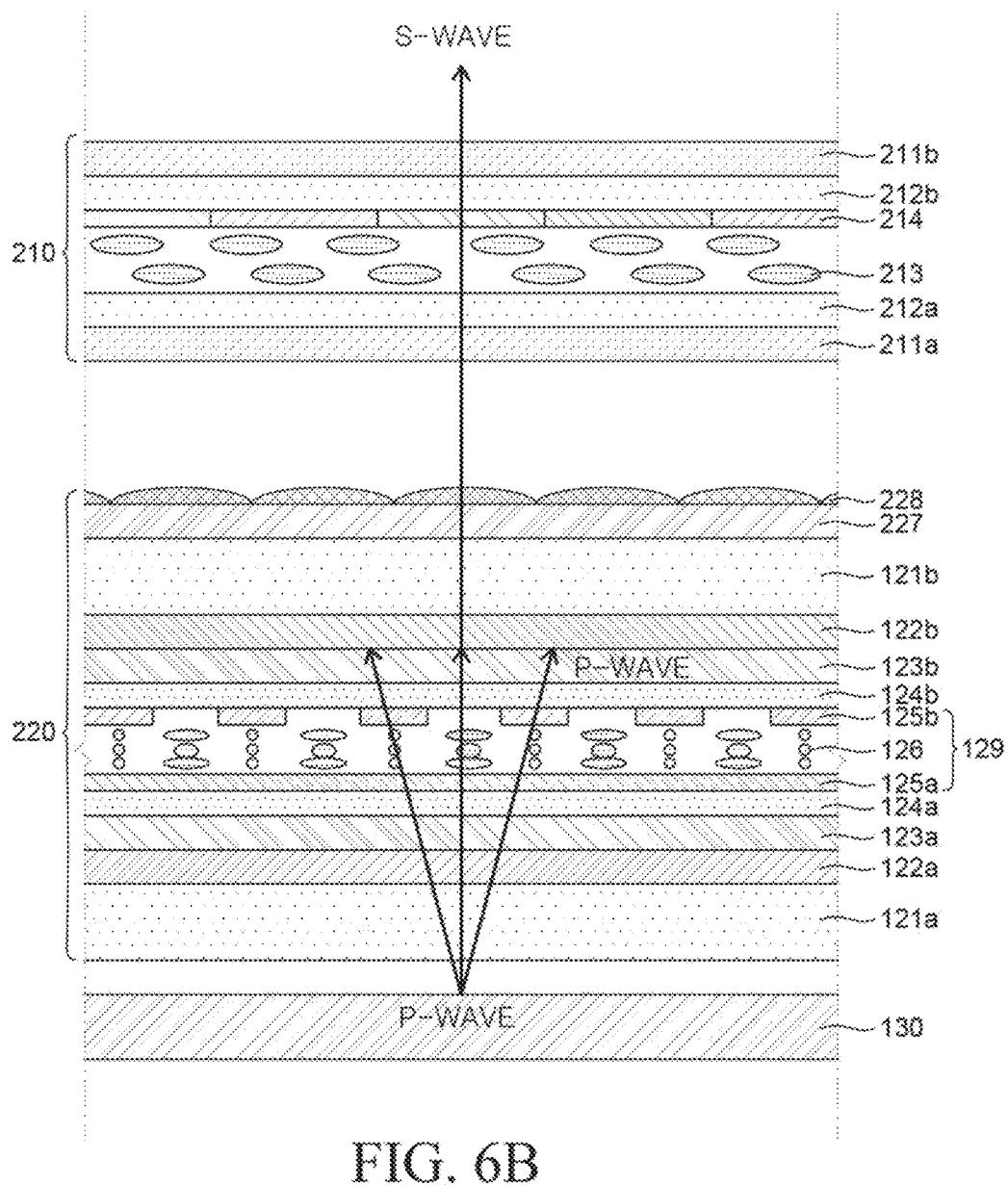
FIG. 6B is a view illustrating a privacy mode of a display device having a switchable viewing angle according to a second exemplary embodiment of the present disclosure.

FIG. 6B illustrates a privacy mode of a display device having a switchable viewing angle according to a second exemplary embodiment of the present disclosure.

FIG. 5 illustrates structures of a viewing angle control panel 220 and a backlight unit 130 according to a second exemplary embodiment of the present disclosure. Further, FIGS. 6A and 6B illustrate the display device having a switchable viewing angle according to the second exemplary embodiment of the present disclosure, that is, structures of a viewing angle control panel 220, a backlight unit 130, and a display panel 210.

FIG. 6A illustrates a display device having a switchable viewing angle in which the voltage is not applied to one pair of electrodes 125a and 125b and FIG. 6B illustrates a display device having a switchable viewing angle in which the voltage is applied to one pair of electrodes 125a and 125b.

FIGS. 6A and 6B illustrate a traveling state of light at a predetermined point depending on whether to apply a voltage. That is, the traveling state of the light in front of the display panel 210 is illustrated as an example.

FIGS. 5, 6A, and 6B are configured by the substantially same configuration as the first exemplary embodiment of the present disclosure in FIGS. 3A, 3B, 4A, and 4B except that the pixel lens 228 is added to an upper layer of the viewing angle control panel 220 and the display panel 210 is disposed above the viewing angle control panel 220. Therefore, the same configuration is denoted by the same reference numeral and a description thereof will be omitted.

Hereinafter, an example that the display panel 210 is configured by the liquid crystal display panel will be described, but it is not limited thereto.

Referring to FIGS. 5, 6A, and 6B, the display panel 210 may be disposed above the viewing angle control panel 220 and the backlight unit 130 may be disposed therebelow.

The backlight unit 130 according to the second exemplary embodiment of the present disclosure applies a polarization light source to supply light polarized to, for example, a P wave or S wave.

The backlight unit 130 according to the second exemplary embodiment of the present disclosure is the same as the above-described backlight unit 130 according to the first exemplary embodiment of the present disclosure and a description thereof will be omitted.

In the display panel 210 of the second exemplary embodiment of the present disclosure, an array substrate 212a and a color filter substrate 212b are spaced apart from each other to be opposite and a liquid crystal layer 213 may be interposed between the array substrate 212a and the color filter substrate 212b. Here, for the convenience of description, the array substrate 212a and the color filter substrate 212b may be referred to as a first substrate and a second substrate, respectively.

The first substrate 212a may include a gate line and a data line which intersect to define a pixel area and a thin film transistor of a switching element formed at the intersection of the gate line and the data line.

Further, for example, in the pixel area of the first substrate 212a, a plurality of common electrodes and a plurality of pixel electrodes are alternately disposed to produce an image.

Further, on the second substrate 212b, a black matrix (not illustrated) having an opening corresponding to each pixel area is disposed and a color filter layer 214 including red, green, and blue color filters which are sequentially and repeatedly disposed to correspond to the opening may be disposed.

An overcoat layer (not illustrated) may be disposed above the black matrix and the color filter layer 214.

Further, a lower polarizer 211a and an upper polarizer 211b may be attached on outer surfaces of the first substrate 212a and the second substrate 212b, respectively. For the convenience of description, the lower polarizer 211a and the upper polarizer 211b may be referred to as a third polarizer and a fourth polarizer.

At this time, polarization axes of the third polarizer 211a and the fourth polarizer 211b may be orthogonal to each other.

As described above, the backlight light of the P-wave or S-wave which is emitted through the backlight unit 130 is incident onto the viewing angle control panel 220. In FIGS.

6A and 6B, it is illustrated that backlight light which is polarized to the P-wave is incident onto the viewing angle control panel 220 as an example, but the present disclosure is not limited thereto so that the backlight light which is polarized to the S-wave may be incident onto the viewing angle control panel 220.

Next, the viewing angle control panel 220 according to the second exemplary embodiment of the present disclosure may largely include a viewing angle control layer 129, and a first polarizer 122a and a second polarizer 122b which are disposed below and above the viewing angle control layer 129, respectively. The viewing angle control panel 220 according to the second exemplary embodiment of the present disclosure may further include a pixel lens 228 disposed above the second polarizer 122b.

For example, the first polarizer 122a may have a transmission axis which matches a polarization direction of the backlight light. For example, when the backlight light has a horizontal polarization of the P-wave, the first polarizer 122a has a transmission axis of 0° and an absorption axis of 90°.

For example, the second polarizer 122b may have a transmission axis which is perpendicular to a polarization direction of the backlight light. For example, when the backlight light has a horizontal polarization of the P-wave, the second polarizer 122b may have a transmission axis of 90° and an absorption axis of 0°. That is, the transmission axis of the second polarizer 122b may be perpendicular to the transmission axis of the first polarizer 122a.

For example, a first TAC layer 121a and a second TAC layer 121b may be disposed at the outsides of the first polarizer 122a and the second polarizer 122b, respectively. Further, an adhesive layer may be further disposed at the outside of the second TAC layer 121b. For example, the adhesive layer may include a pressure sensitive adhesive.

For example, a first phase delay compensation film 123a of ORT may be disposed between the first polarizer 122a and the viewing angle control layer 129, but is not limited thereto and may be omitted if necessary.

For example, a first protective layer 124a may be disposed between the first phase delay compensation film 123a and the viewing angle control layer 129, but is not limited thereto and may be omitted if necessary.

For example, a second phase delay compensation film 123b of ORT may be disposed between the second polarizer 122b and the viewing angle control layer 129, but is not limited thereto and may be omitted if necessary.

For example, a second protective layer 124b may be disposed between the second phase delay compensation film 123b and the viewing angle control layer 129, but is not limited thereto and may be omitted if necessary.

The viewing angle control layer 129 may include a lower electrode 125a and an upper electrode 125b, and a liquid crystal layer 126 disposed between the lower electrode 125a and the upper electrode 125b.

At this time, for example, the lower electrode 125a may be configured as a whole electrode over the active area AA, but is not limited thereto. For example, the lower electrode 125a extends to the non-active area NA to overlap a part of the non-active area NA.

In contrast, for example, the upper electrode 125b may be configured as a plurality of bars parallel in one direction over the active area AA.

Further, for example, the upper electrode 125b may be configured as a plurality of bars which is parallel to each other with a regular interval.

The upper electrode 125b and the lower electrode 125a may be configured by a transparent conductive material, for example, at least one of indium tin oxide (ITO), indium zinc oxide (IZO), carbon nanotubes, metal nanowires, and poly (3,4-ethylenedioxythiophene) (PEDOT).

In the meantime, the liquid crystal layer 126 may be configured by twisted nematic (TN) liquid crystal with a fast response speed.

Further, as illustrated in FIG. 6A, when the electric field is not applied between the upper electrode 125b and the lower electrode 125a, the state of the liquid crystal layer 126 is the same in all the areas of the viewing angle control layer 129.

In contrast, as illustrated in FIG. 6B, when the electric field is applied between the upper electrode 125b and the lower electrode 125a, the state of the liquid crystal layer 126 is different between an area where the upper electrode 125b is disposed and an area where the upper electrode 125b is not disposed.

First, when an electric field is not applied between the upper electrode 125b and the lower electrode 125a, referring to FIG. 6A, for example, the backlight light having a horizontal polarization of the P-wave is incident onto the viewing angle control panel 220. Hereinafter, a behavior of the backlight light of the P-wave incident onto the viewing angle control panel 220 at one point of the backlight unit 130 will be described as an example, for the convenience of description.

In this case, the first polarizer 122a has the transmission axis which matches the polarization direction of the backlight light so that the backlight light of the P-wave may pass through the first polarizer 122a without causing the loss. For example, the backlight light of the P-wave which is incident onto the viewing angle control panel 220 at one point of the backlight unit 130 may pass through the first polarizer 122a in all the central, left and right directions.

Further, in this case, the state of the liquid crystal layer 126 may be the same in all the areas of the viewing angle control layer 129. That is, as the liquid crystal molecules of the liquid crystal layer 126 spirally rotate, the traveling direction of light which passes through the first polarizer 122a rotates to change the polarization direction of the light of the P-wave to the S wave in all the central, left and right directions. In this case, the light of the S-wave may pass through the viewing angle control panel 220 in both the area in which the upper electrode 125b is disposed and the area in which the upper electrode 125b is not disposed.

Further, in this case, the light whose polarization direction is changed to the S-wave may pass through the second polarizer 122b having a transmission axis which is perpendicular to the polarization direction of the backlight light without causing the loss. For example, the backlight light traveling from the viewing angle control panel 220 to the second polarizer 122b may pass through the second polarizer 122b in all the central, left and right directions.

Further, in this case, the backlight light which passes through the second polarizer 122b in all the central, left and right directions is provided to the display panel 210 to implement a share mode. That is, not only backlight light traveling in the central direction, but also backlight light which diagonally travels in the left and right directions is provided to the display panel 210 so that clear and undistorted image quality may be implemented in the wide viewing angle range.

Next, when the electric field is applied between the upper electrode 125b and the lower electrode 125a, referring to FIG. 6B, the backlight light having a horizontal polarization of the P-wave is incident onto the viewing angle control panel 120 as described above.

In this case, the first polarizer 122*a* has the transmission axis which matches the polarization direction of the backlight light so that the backlight light of the P-wave may pass through the first polarizer 122*a* without causing the loss. For example, the backlight light of the P-wave which is incident onto the viewing angle control panel 220 at one point of the backlight unit 130 may pass through the first polarizer 122*a* in the central, left and right directions.

In contrast, in this case, the state of the liquid crystal layer 126 may be different between the area in which the upper electrode 125*b* is disposed and the area in which the upper electrode 125*b* is not disposed. That is, as the spirally rotated state of the liquid crystal molecules of the liquid crystal layer 126 is maintained in the area in which the upper electrode 125*b* is not disposed, the traveling direction of light which passes through the first polarizer 122*a* rotates to change the polarization direction of the light of the P-wave to the S wave. In this case, the light whose polarization direction is changed to the S-wave may pass through the second polarizer 122*b* having a transmission axis which is perpendicular to the polarization direction of the backlight light without causing the loss. For example, the backlight light traveling from the viewing angle control panel 220 to the second polarizer 122*b* in the central direction may pass through the second polarizer 122*b* without causing the loss.

In contrast, in the area in which the upper electrode 125*b* is disposed, the liquid crystal molecules of the liquid crystal layer 126 are realigned by the electric field so that the spiral shape is unraveled and the liquid crystal molecules are aligned in one line. By doing this, the light of the P-wave passes through the TN liquid crystal layer 126 without changing the polarized state. In this case, the light of the P-wave may not pass through the second polarizer 122*b* having a transmission axis which is perpendicular to the polarization direction of the backlight light. For example, the backlight light traveling from the viewing angle control panel 220 to the second polarizer 122*b* in the left and right directions, that is, in the diagonal direction may be blocked by the second polarizer 122*b* to implement a privacy mode. That is, only a person who is sitting in front of the screen may watch the image on the screen to smoothly work with confidential documents or perform tasks which requires security.

As described above, the second exemplary embodiment of the present disclosure may provide the display device having a switchable viewing angle in which a polarized state of a backlight light source and a light path are controlled to switch the privacy mode and the share mode and the luminance is improved without increasing power consumption specifically in the share mode.

Further, the display device having a switchable viewing angle which uses the TN liquid crystal with the fast response speed to control the light path to improve the switching speed between the share mode and the privacy mode may be provided.

In the meantime, the display device having a switchable viewing angle according to the second exemplary embodiment of the present disclosure may further include a pixel lens 228 disposed in an upper layer of the viewing angle control panel 220.

For example, a lens assembly may be disposed above the second polarizer 122*b*. For example, the lens assembly may include a plurality of pixel lenses 228 disposed on the substrate 227. The lens assembly may be located on a path of the light emitted from the backlight unit 130.

A lower surface of each pixel lens 228 which faces the second polarizer 122*b* may be a flat plane. A surface of each pixel lens 228 which is opposite to the display panel 210 may have a semicircular shape, but is not limited thereto. The plurality of pixel lenses 228 may be located in parallel. For example, the lens assembly may include a lenticular lens.

For example, each pixel area of the display panel 210 may overlap one of the pixel lenses 228. Therefore, in the display device having a switchable viewing angle according to the second exemplary embodiment of the present disclosure, the backlight light passes through one of the pixel lenses 228 to be emitted to each pixel area and be provided to the user. Accordingly, in the display device having a switchable viewing angle according to the second exemplary embodiment of the present disclosure, a center luminance of each pixel area may be improved.

Even though it is illustrated, the lens assembly may further include a cover layer which covers the pixel lens 228. The cover layer may suppress the damage of the pixel lens 228 due to the external impact. For example, the semicircular surface of each pixel lens 228 may be fully covered by the cover layer. The cover layer may remove a step caused by the pixel lens 228. For example, the cover layer may include an insulating material.

For example, the plurality of pixel lenses 228 may be disposed to be parallel to the data line with a regular interval and each pixel lens 228 may be configured as a plurality of bars which is parallel, but is not limited thereto.

For example, each pixel lens 228 may be disposed so as to correspond to an area between the upper electrodes 125*b*, that is, a non-pattern area.

Further, for example, each pixel lens 228 may be disposed so as to correspond to each of red, green, and blue color filters of the color filter layer 214.

Figure 7:
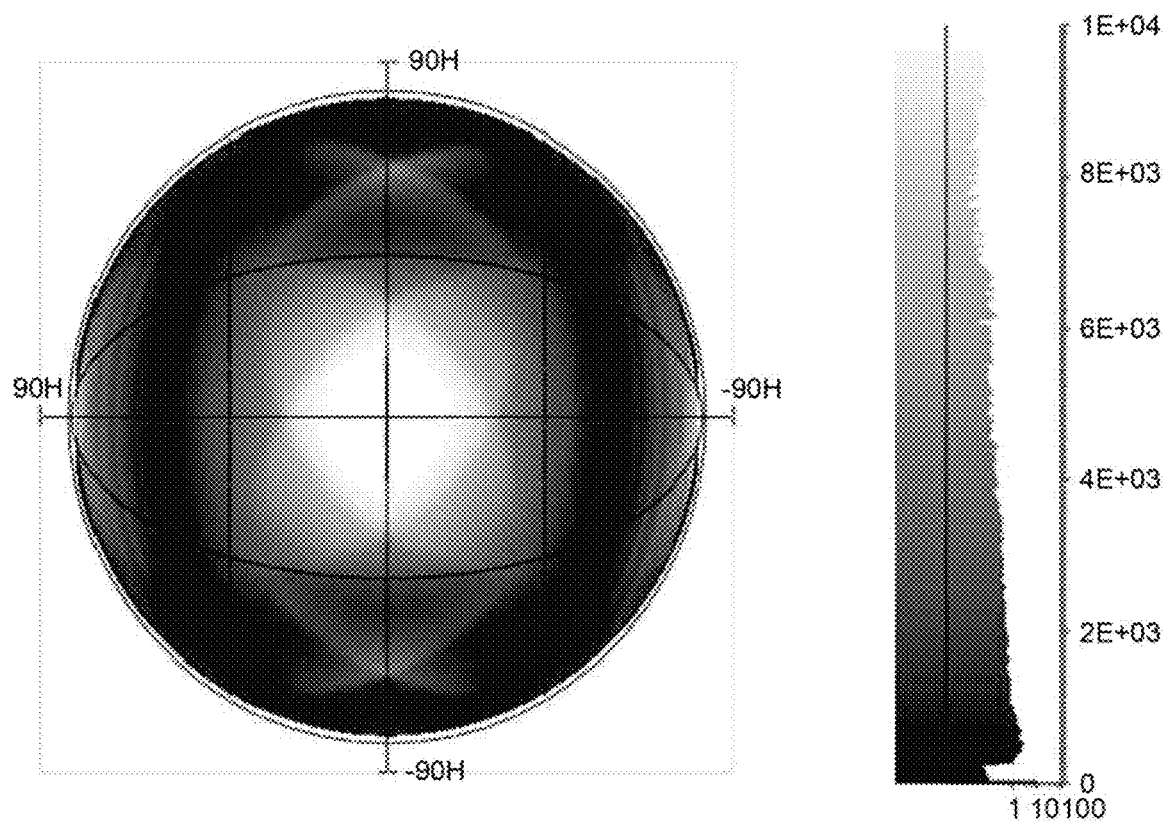
FIG. 7 is a simulation result illustrating a transmissive characteristic in a display device without a viewing angle control panel as an example.

FIG. 7 is a simulation result illustrating a transmissive characteristic in a display device without a viewing angle control panel as an example.

Figure 8A:
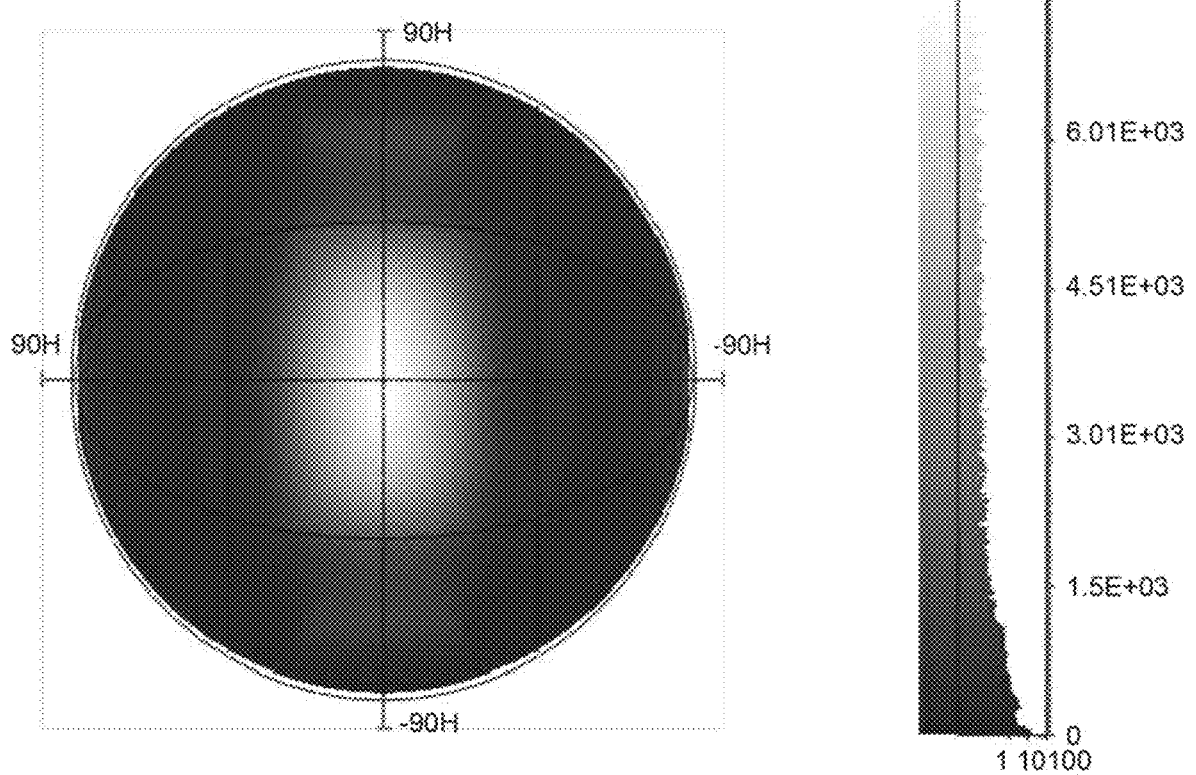
FIGS. 8A and 8B are simulation results illustrating transmissive characteristics in a privacy mode and a share mode of a display device having a switchable viewing angle according to a comparative embodiment.
Figure 8B:
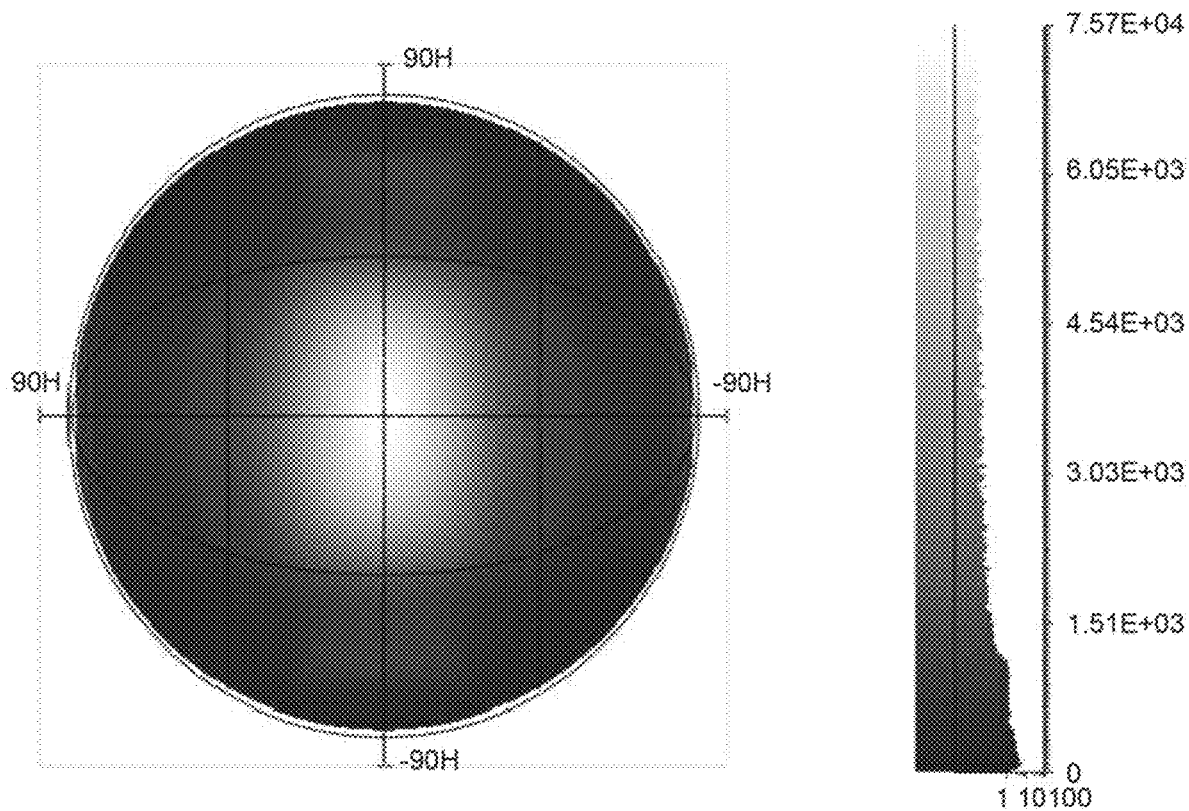

FIGS. 8A and 8B are simulation results illustrating transmissive characteristics in a privacy mode and a share mode of a display device having a switchable viewing angle according to a comparative embodiment.

Figure 9A:
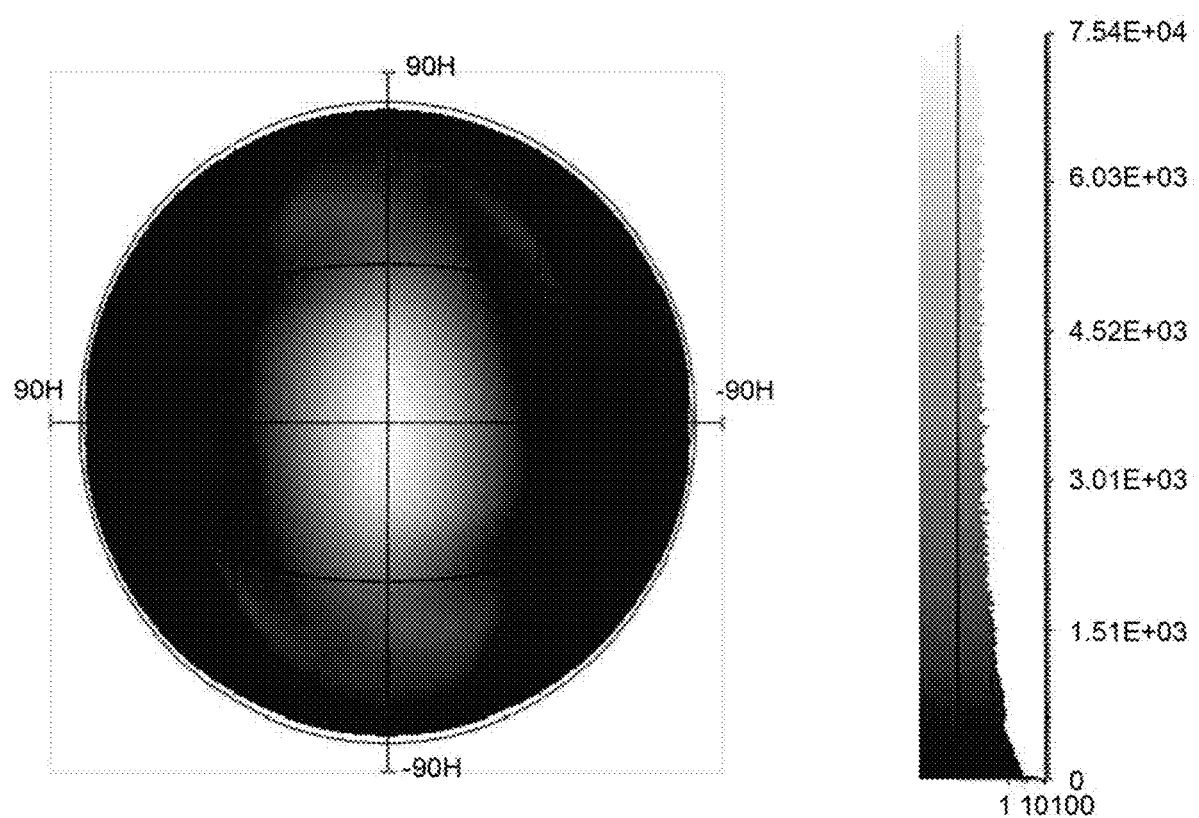
FIGS. 9A and 9B are simulation results illustrating transmissive characteristics in a privacy mode and a share mode of a display device having a switchable viewing angle according to a second exemplary embodiment of the present disclosure.
Figure 9B:
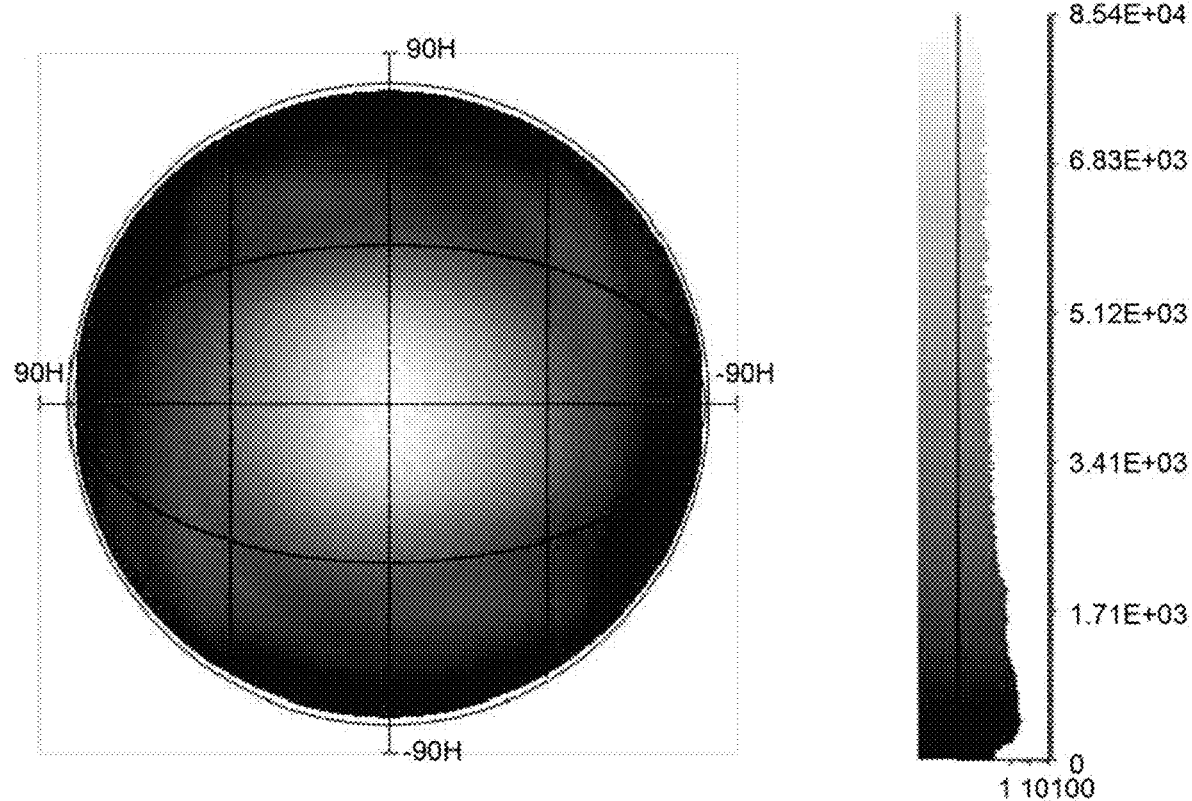

FIGS. 9A and 9B are simulation results illustrating transmissive characteristics in a privacy mode and a share mode of a display device having a switchable viewing angle according to a second exemplary embodiment of the present disclosure.

Figure 10:
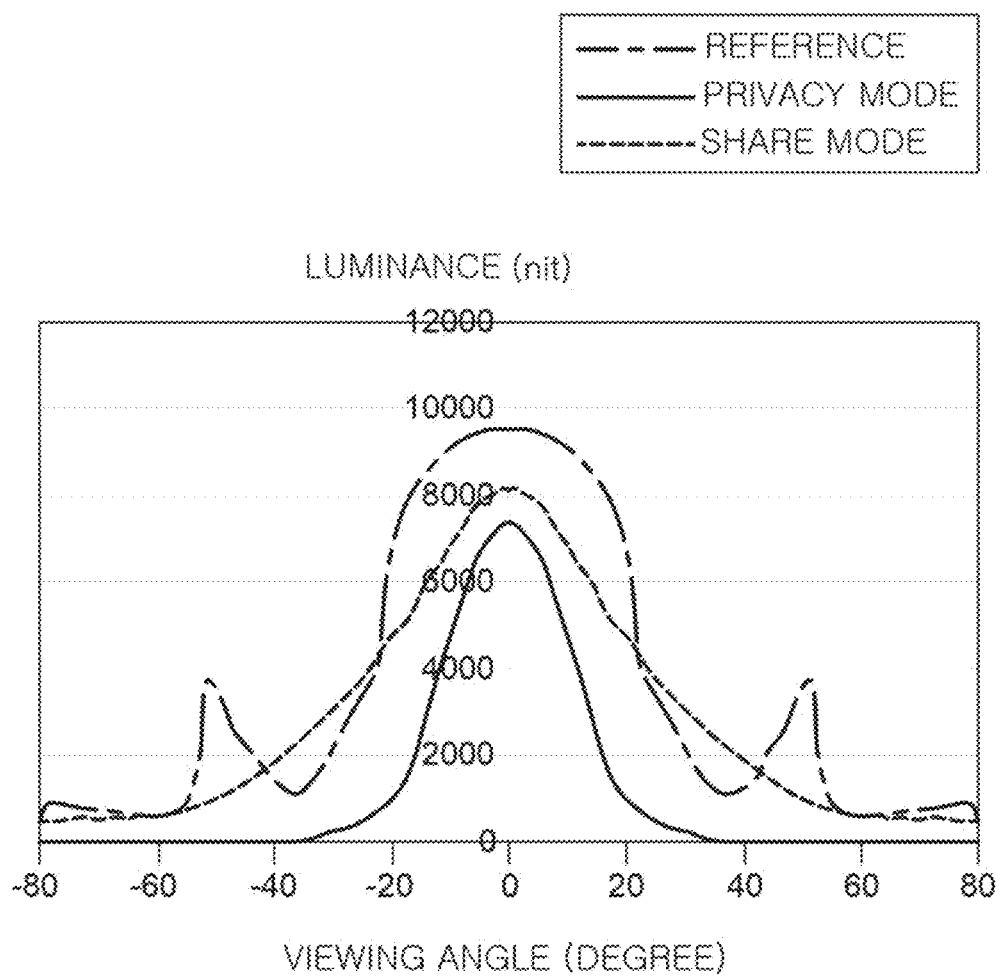
FIG. 10 is a graph illustrating a luminance change in accordance with a viewing angle as an example.

FIG. 10 is a graph illustrating a luminance change in accordance with a viewing angle as an example.

The comparative embodiment of FIGS. 8A and 8B describes a TFS which uses an un-polarized backlight light source and EC as an example.

Further, FIGS. 8A, 8B, 9A, and 9B illustrate the transmission characteristics of a privacy mode and a share mode in the display devices with a switchable viewing angle according to the comparative embodiment and the second exemplary embodiment of the present disclosure, respectively.

First, referring to FIGS. 7 and 8A, in the comparative embodiment, as compared with the luminance of a normal backlight unit (reference) of FIG. 7, it is understood that a luminance efficiency is approximately 75% at a viewing angle of 0° and a luminance efficiency is approximately 0.5% at a viewing angle of 45°, in the privacy mode.

Further, referring to FIGS. 7 and 8B, in the comparative embodiment, as compared with the luminance of a normal backlight unit of FIG. 7, it is understood that a luminance efficiency is approximately 75% at a viewing angle of 0° and a luminance efficiency is approximately 8% at a viewing angle of 45°, in the share mode.

In contrast, referring to FIGS. 7 and 9A, in the second exemplary embodiment of the present disclosure, as compared with the luminance of a normal backlight unit of FIG. 7, it is understood that a luminance efficiency is approximately 75% at a viewing angle of 0° and a luminance efficiency is approximately 0.0% at a viewing angle of 45°, in the privacy mode. That is, as compared with the comparative embodiment, the luminance efficiency is not reduced at the viewing angle of 0° and the luminance efficiency is dramatically reduced at the viewing angle of 45° so that the privacy mode may be properly implemented.

Further, referring to FIGS. 7 and 9B, in the second exemplary embodiment of the present disclosure, as compared with the luminance of a normal backlight unit of FIG. 7, it is understood that a luminance efficiency is approximately 85% at a viewing angle of 0° and a luminance efficiency is approximately 17.8% at a viewing angle of 45°, in the share mode. That is, it is understood that the luminance is improved by two times at the viewing angle of 45° as compared with the comparative embodiment.

Further, referring to FIG. 10, in the case of the privacy mode according to the second exemplary embodiment of the present disclosure, it is understood that as the viewing angle is increased, the luminance is sharply reduced and the luminance is close to 0 at a viewing angle which is equal to or larger than approximately 30°.

Further, in the share mode according to the second exemplary embodiment of the present disclosure, it is understood that the luminance is totally improved as compared with the privacy mode and even though the viewing angle is increased, the luminance is not sharply reduced.

In the meantime, the lower polarizer of the display panel replaces the upper polarizer of the viewing angle control panel so that the second TAC layer and the upper polarizer and the second phase delay compensation film in an upper portion of the viewing angle control panel may be deleted. This will be described in more detail with reference to a third exemplary embodiment of the present disclosure.

Figure 11:
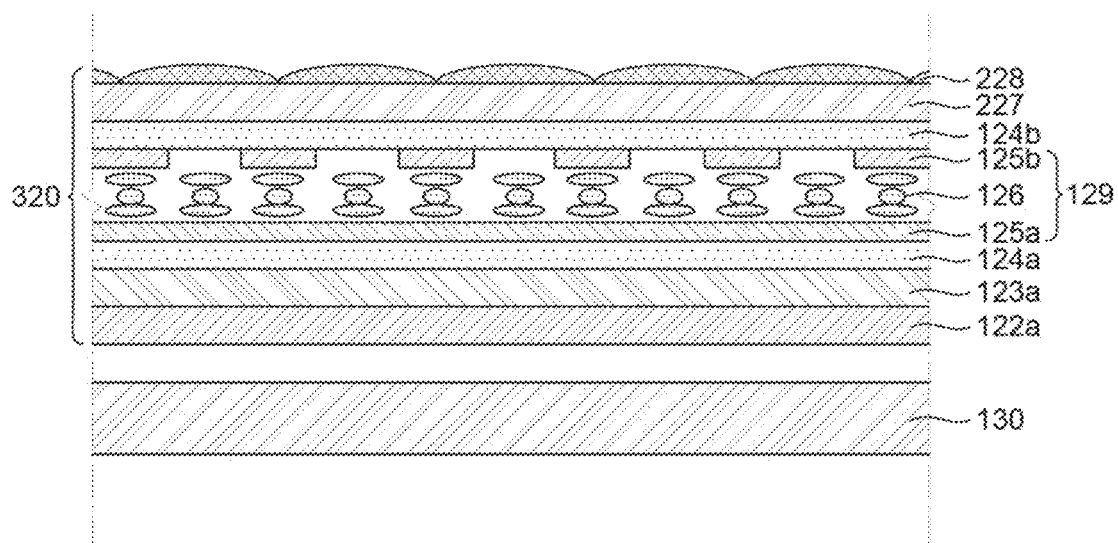
FIG. 11 is a cross-sectional view illustrating a part of a display device having a switchable viewing angle according to a third exemplary embodiment of the present disclosure.

FIG. 11 is a cross-sectional view illustrating a part of a display device having a switchable viewing angle according to a third exemplary embodiment of the present disclosure.

FIG. 11 illustrates structures of a viewing angle control panel 320 and a backlight unit 130 according to a third exemplary embodiment of the present disclosure. In FIG. 11, for the convenience of description, a display panel above the viewing angle control panel 320 is omitted.

FIG. 11 is configured by the substantially same configuration as the second exemplary embodiment of the present disclosure of FIGS. 5, 6A, and 6B described above except that the second TAC layer, the upper polarizer and the second phase delay compensation film in an upper layer of the viewing angle control panel 320 are deleted. Therefore, the same configuration is denoted by the same reference numeral and a description thereof will be omitted.

Referring to FIG. 11, as described above, the display panel may be disposed above the viewing angle control panel 320 and the backlight unit 130 may be disposed therebelow.

The backlight unit 130 according to the third exemplary embodiment of the present disclosure applies a polarization light source to supply light polarized to, for example, a P wave or S wave.

The viewing angle control panel 320 according to the third exemplary embodiment of the present disclosure may include a viewing angle control layer 129 and a first polarizer 122a disposed below the viewing angle control layer 129. The viewing angle control panel 320 according to the third exemplary embodiment of the present disclosure may further include a pixel lens 228 disposed above the viewing angle control layer 129.

For example, the first polarizer 122a may have a transmission axis which matches a polarization direction of the backlight light. For example, when the backlight light has a horizontal polarization of the P-wave, the first polarizer 122a may have a transmission axis of 0° and an absorption axis of 90°.

For example, a first TAC layer 121a may be disposed at the outside of the first polarizer 122a.

For example, a first phase delay compensation film 123a of ORT may be disposed between the first polarizer 122a and the viewing angle control layer 129, but is not limited thereto and may be omitted if necessary.

For example, a first protective layer 124a may be disposed between the first phase delay compensation film 123a and the viewing angle control layer 129, but is not limited thereto and may be omitted if necessary.

For example, a second protective layer 124b may be disposed between the pixel lens 228 and the viewing angle control layer 129, but is not limited thereto and may be omitted if necessary.

In the meantime, in the case of the third exemplary embodiment of the present disclosure, the second TAC layer, the second polarizer, and the second phase delay compensation film may not be disposed above the viewing angle control layer 129. Therefore, a total thickness of the display device having a switchable viewing angle may be reduced.

Further, even though it is not illustrated, in the display panel according to the third exemplary embodiment of the present disclosure, the first substrate and the second substrate are spaced apart from each other to be opposite and a liquid crystal layer may be interposed between the first substrate and the second substrate.

Further, a lower polarizer and an upper polarizer may be attached to outer surfaces of the first substrate and the second substrate, respectively. For the convenience of description, the lower polarizer and the upper polarizer may be referred to as a third polarizer and a fourth polarizer.

At this time, polarization axes of the third polarizer and the fourth polarizer may be orthogonal to each other.

Further, in the third exemplary embodiment of the present disclosure, the third polarizer may replace the upper polarizer of the viewing angle control panel.

Accordingly, for example, the third polarizer may have a transmission axis which is perpendicular to a polarization direction of the backlight light. For example, when the backlight light has a horizontal polarization of the P-wave, the third polarizer may have a transmission axis of 90° and an absorption axis of 0°. That is, the transmission axis of the third polarizer may be perpendicular to the transmission axis of the first polarizer 122a.

In the meantime, according to the present disclosure, the surface of the pixel lens may have a shape other than the semicircle, which will be described in more detail with reference to a fourth exemplary embodiment of the present disclosure.

Figure 12:
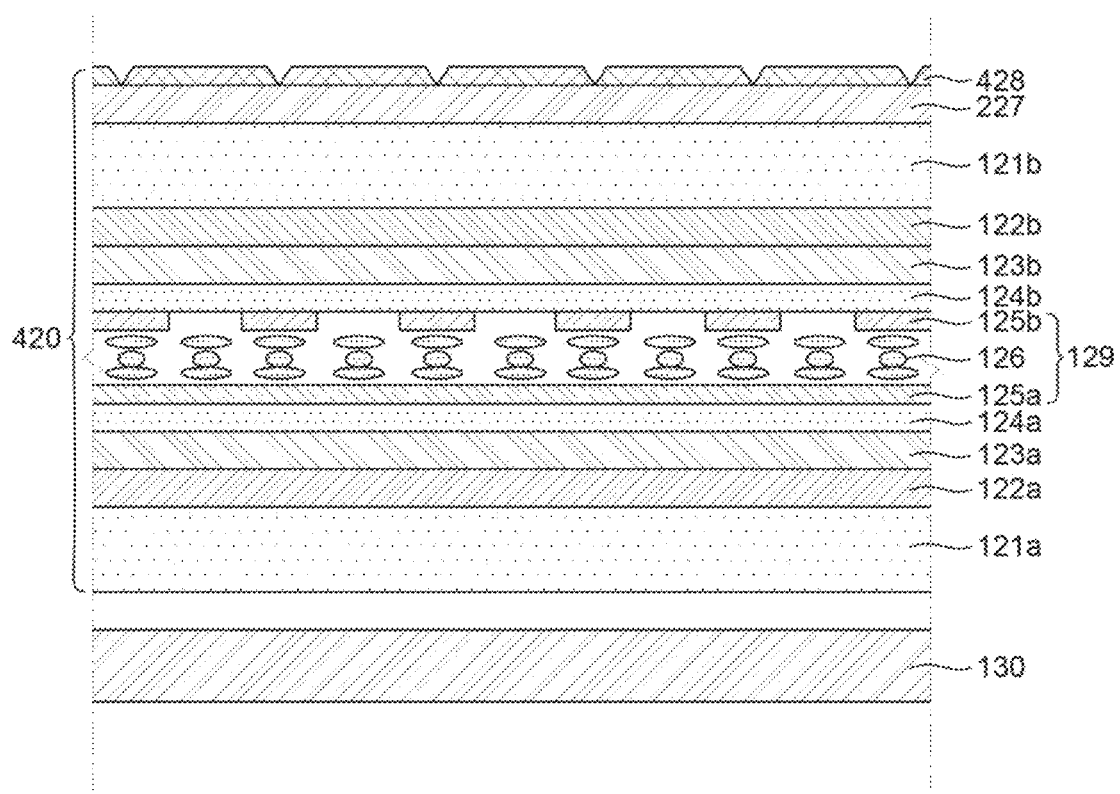
FIG. 12 is a cross-sectional view illustrating a part of a display device having a switchable viewing angle according to a fourth exemplary embodiment of the present disclosure.

FIG. 12 is a cross-sectional view illustrating a part of a display device having a switchable viewing angle according to a fourth exemplary embodiment of the present disclosure.

FIG. 12 illustrates structures of a viewing angle control panel 420 and a backlight unit 130 according to a fourth exemplary embodiment of the present disclosure. In FIG.

12, for the convenience of description, a display panel above the viewing angle control panel 420 is omitted.

FIG. 12 is configured by the substantially same configuration as the second exemplary embodiment of the present disclosure of FIGS. 5, 6A, and 6B described above except that the surface of the pixel lens 428 has a trapezoidal shape. Therefore, the same configuration is denoted by the same reference numeral and a description thereof will be omitted.

Referring to FIG. 12, as described above, the display panel may be disposed above the viewing angle control panel 420 and the backlight unit 130 may be disposed there below.

Further, the display device having a switchable viewing angle according to the fourth exemplary embodiment of the present disclosure may further include a pixel lens 428 disposed in an upper layer of the viewing angle control panel 420.

For example, a lens assembly may be disposed above the second polarizer 122b. For example, the lens assembly may include a plurality of pixel lenses 428 disposed on the substrate 227. The lens assembly may be located on a path of the light emitted from the backlight unit 130.

A lower surface of each pixel lens 428 which faces the second polarizer 122b may be a flat plane. A surface of each pixel lens 428 which is opposite to the display panel may have a trapezoidal shape, but is not limited thereto. The plurality of pixel lenses 428 may be located in parallel. As described above, as the surface of the pixel lens 428 has a trapezoidal shape, the backlight light which passes in the central direction may be increased so that the luminance in the vertical direction may be improved. As a result, the efficiency is increased.

For example, each pixel area of the display panel may overlap one of the pixel lenses 428. Therefore, in the display device having a switchable viewing angle according to the fourth exemplary embodiment of the present disclosure, the backlight light passes through one of the pixel lenses 428 to be emitted to each pixel area and be provided to the user. Accordingly, in the display device having a switchable viewing angle according to the fourth exemplary embodiment of the present disclosure, a center luminance of each pixel area may be improved.

Even though it is not illustrated, the lens assembly may further include a cover layer which covers the pixel lens 428. The cover layer may suppress the damage of the pixel lens 428 due to the external impact. For example, the trapezoidal surface of each pixel lens 428 may be fully covered by the cover layer. The cover layer may remove a step caused by the pixel lens 428. For example, the cover layer may include an insulating material.

For example, the plurality of pixel lenses 428 may be disposed to be parallel to the data line with a regular interval and each pixel lens 428 may be configured as a plurality of bars which is parallel, but is not limited thereto.

For example, each pixel lens 428 may be disposed so as to correspond to an area between the upper electrodes 125b, that is, a non-pattern area.

Further, for example, each pixel lens 428 may be disposed so as to each of red, green, and blue color filters of the color filter layer.

In the meantime, according to the present disclosure, a support substrate may be added below the viewing angle control layer, which will be described in more detail with reference to a fifth exemplary embodiment of the present disclosure.

Figure 13:
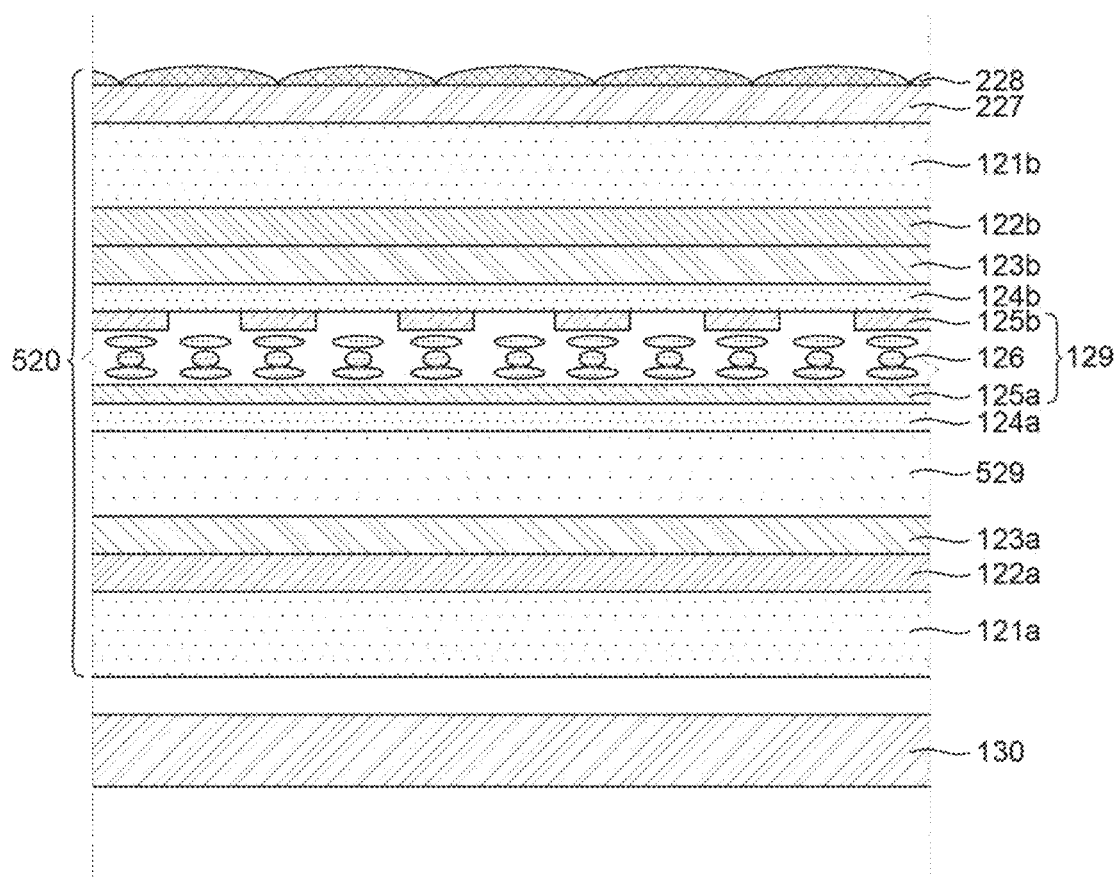
FIG. 13 is a cross-sectional view illustrating a part of a display device having a switchable viewing angle according to a fifth exemplary embodiment of the present disclosure.

FIG. 13 is a cross-sectional view illustrating a part of a display device having a switchable viewing angle according to a fifth exemplary embodiment of the present disclosure.

FIG. 13 illustrates structures of a viewing angle control panel 520 and a backlight unit 130 according to a fifth exemplary embodiment of the present disclosure. In FIG. 13, for the convenience of description, a display panel above the viewing angle control panel 520 is omitted.

FIG. 13 is configured by the substantially same configuration as the second exemplary embodiment of the present disclosure of FIGS. 5, 6A, and 6B described above except that a support substrate 529 is added below the viewing angle control layer 129. Therefore, the same configuration is denoted by the same reference numeral and a description thereof will be omitted.

Referring to FIG. 13, as described above, the display panel may be disposed above the viewing angle control panel 520 and the backlight unit 130 may be disposed therebelow.

Further, the display device having a switchable viewing angle according to the fifth exemplary embodiment of the present disclosure may further include a support substrate 529 disposed below the viewing angle control layer 129.

For example, the support substrate 529 may be formed of glass, but is not limited thereto.

For example, the support substrate 529 may be disposed between the viewing angle control layer 129 and the first polarizer 122a. For example, the support substrate 529 may be disposed between the first protective layer 124a and the first polarizer 122a. For example, the support substrate 529 may be disposed between the first protective layer 124a and the first phase delay compensation film 123a.

As described above, in the fifth exemplary embodiment of the present disclosure, the support substrate 529 is added below the viewing angle control layer 129 so that the configurations disposed above the support substrate 529 may be supported during the process, together with the viewing angle control layer 129. Therefore, the process is possible regardless of the process temperature. Therefore, the fairness is improved.

In the meantime, according to the present disclosure, the display panel may be formed on the viewing angle control panel in the add-on manner, which will be described in more detail with reference to a sixth exemplary embodiment of the present disclosure.

Figure 14:
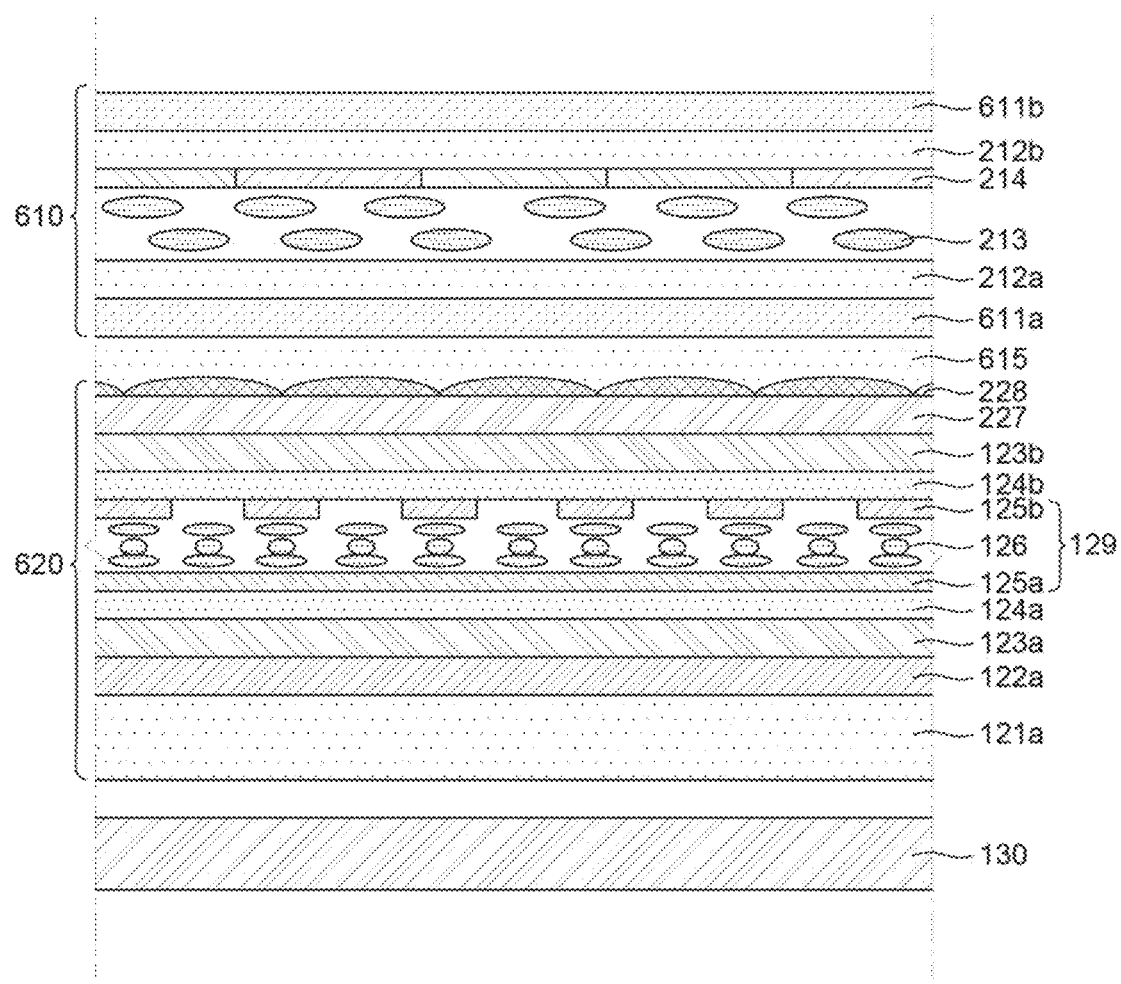
FIG. 14 is a cross-sectional view illustrating a part of a display device having a switchable viewing angle according to a sixth exemplary embodiment of the present disclosure.

FIG. 14 is a cross-sectional view illustrating a part of a display device having a switchable viewing angle according to a sixth exemplary embodiment of the present disclosure.

FIG. 14 illustrates the display device having a switchable viewing angle according to the sixth exemplary embodiment of the present disclosure, that is, structures of a viewing angle control panel 620, a backlight unit 130, and a display panel 610.

FIG. 14 is configured by the substantially same configuration as the second exemplary embodiment of the present disclosure of FIGS. 5, 6A, and 6B described above except that a display panel 610 is formed on a viewing angle control panel 620 in the add-on manner. Therefore, the same configuration is denoted by the same reference numeral and a description thereof will be omitted.

Hereinafter, an example that the display panel 610 is configured by the liquid crystal display panel will be described, but it is not limited thereto.

Referring to FIG. 14, as described above, the display panel 610 may be disposed above the viewing angle control panel 620 and the backlight unit 130 may be disposed therebelow.

Further, in the display device having a switchable viewing angle according to the sixth exemplary embodiment of the present disclosure, the display panel 610 may be formed on the viewing angle control panel 620 in the add-on manner.

Further, in the sixth exemplary embodiment of the present disclosure, like the above-described third exemplary embodiment of the present disclosure, a lower polarizer 611a of the display panel 610 may replace the upper polarizer of the viewing angle control panel 620.

The viewing angle control panel 620 according to the sixth exemplary embodiment of the present disclosure may include a viewing angle control layer 129 and a first polarizer 122a disposed below the viewing angle control layer 129. Further, the viewing angle control panel 620 according to the sixth exemplary embodiment of the present disclosure may further include a pixel lens 228 disposed above the viewing angle control layer 129.

For example, the first polarizer 122a may have a transmission axis which matches a polarization direction of the backlight light. For example, when the backlight light has a horizontal polarization of the P-wave, the first polarizer 122a may have a transmission axis of 0° and an absorption axis of 90°.

For example, a first TAC layer 121a may be disposed at the outside of the first polarizer 122a.

For example, a first phase delay compensation film 123a of ORT may be disposed between the first polarizer 122a and the viewing angle control layer 129, but is not limited thereto and may be omitted if necessary.

For example, a first protective layer 124a may be disposed between the first phase delay compensation film 123a and the viewing angle control layer 129, but is not limited thereto and may be omitted if necessary.

Next, for example, a second protective layer 124b may be disposed between the pixel lens 228 and the viewing angle control layer 129, but is not limited thereto and may be omitted if necessary.

For example, a second phase delay compensation film 123b of ORT may be disposed between the pixel lens 228 and the second protective layer 124b, but is not limited thereto and may be omitted if necessary.

In the meantime, in the case of the sixth exemplary embodiment of the present disclosure, the second TAC layer and the second polarizer may not be disposed above the viewing angle control layer 129. Therefore, a total thickness of the display device having a switchable viewing angle may be reduced.

In the display panel 610 of the sixth exemplary embodiment of the present disclosure, a first substrate 212a and a second substrate 212b are spaced apart from each other to be opposite and a liquid crystal layer 213 may be interposed between the first substrate 212a and the second substrate 212b.

Further, a lower polarizer 611a and an upper polarizer 611b may be attached on outer surfaces of the first substrate 212a and the second substrate 212b, respectively. For the convenience of description, the lower polarizer 611a and the upper polarizer 611b may be referred to as a third polarizer and a fourth polarizer, respectively.

At this time, polarization axes of the third polarizer 611a and the fourth polarizer 611b may be orthogonal to each other.

Further, in the sixth exemplary embodiment of the present disclosure, the third polarizer 611a may replace the upper polarizer of the viewing angle control panel 620.

Accordingly, for example, the third polarizer 611a may have a transmission axis which is perpendicular to a polarization direction of the backlight light. For example, when the backlight light has a horizontal polarization of the P-wave, the third polarizer 611a may have a transmission axis of 90° and an absorption axis of 0°. That is, the transmission axis of the third polarizer 611a may be perpendicular to the transmission axis of the first polarizer 122a.

In the meantime, the lens assembly may further include a cover layer 615 which covers the pixel lens 228. The cover layer 615 may suppress the damage of the pixel lens 228 due to the external impact. For example, the semicircular surface of each pixel lens 228 may be fully covered by the cover layer 615. The cover layer 615 may remove a step caused by the pixel lens 228. For example, the cover layer 615 may include an insulating material. Therefore, the display panel 610 may be attached on the cover layer 615.

For example, the plurality of pixel lenses 228 may be disposed to be parallel to the data line with a regular interval and each pixel lens 228 may be configured as a plurality of bars which is parallel, but is not limited thereto.

For example, each pixel lens 228 may be disposed so as to correspond to an area between the upper electrodes 125b, that is, a non-pattern area.

Further, for example, each pixel lens 228 may be disposed so as to each of red, green, and blue color filters of the color filter layer 214.

As described above, in the sixth exemplary embodiment of the present disclosure, the display panel 610 is formed on the viewing angle control panel 620 in the add-on manner. Therefore, there is no air gap between the viewing angle control panel 620 and the display panel 610 so that the distortion due to the external force may be minimized and thus the reliability is improved.

In the meantime, in the present disclosure, the display panel may be configured by the organic light emitting display panel, other than the liquid crystal display panel, which will be described in more detail with reference to a seventh exemplary embodiment of the present disclosure.

Figure 15:
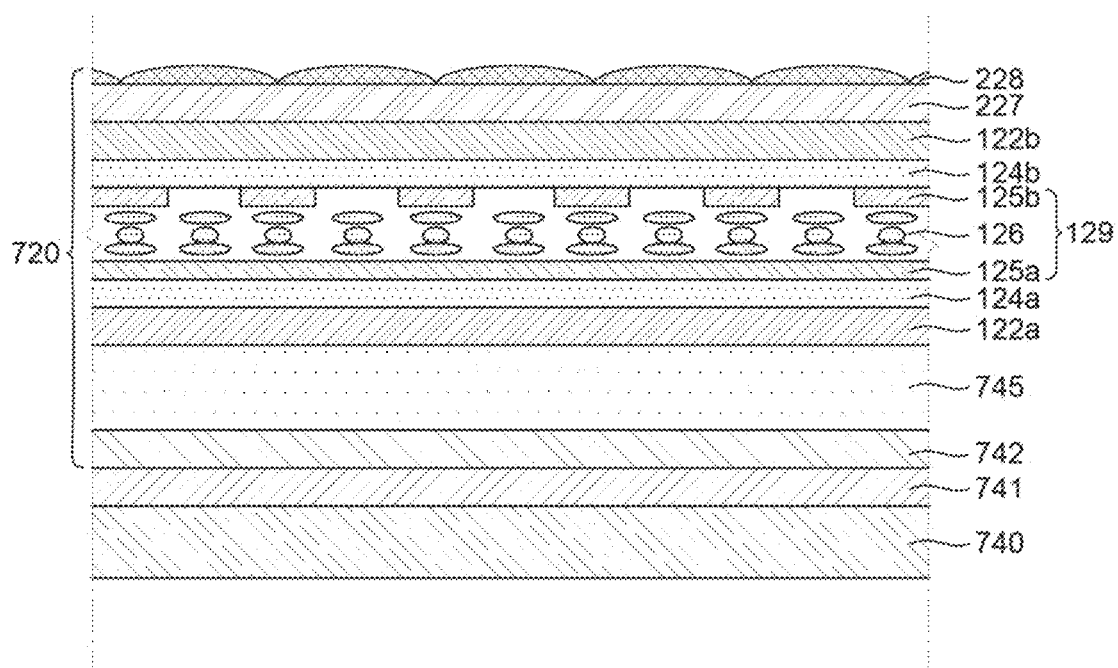
FIG. 15 is a cross-sectional view illustrating a part of a display device having a switchable viewing angle according to a seventh exemplary embodiment of the present disclosure.

FIG. 15 is a cross-sectional view illustrating a part of a display device having a switchable viewing angle according to a seventh exemplary embodiment of the present disclosure.

FIG. 15 illustrates the display device having a switchable viewing angle according to the seventh exemplary embodiment of the present disclosure, that is, structures of a viewing angle control panel 720 and an organic light emitting display panel 740. In this case, the organic light emitting display panel 740 is a self-emitting panel so that the backlight unit is not necessary, unlike the above-described exemplary embodiments.

FIG. 15 is configured by the substantially same configuration as the second exemplary embodiment of the present disclosure of FIGS. 5, 6A, and 6B described above except that a display panel is configured by the organic light emitting display panel 740 and the organic light emitting display panel 740 is disposed below a viewing angle control panel 720 in the add-on manner. Therefore, the same configuration is denoted by the same reference numeral and a description thereof will be omitted.

Referring to FIG. 15, in the seventh exemplary embodiment of the present disclosure, the organic light emitting display panel 740 is disposed below the viewing angle control panel 720 and thus a separate backlight unit is not necessary.

Further, in the display device having a switchable viewing angle according to the seventh exemplary embodiment of the present disclosure, the organic light emitting display panel 740 may be formed below the viewing angle control panel 720 in the add-on manner.

Further, in the seventh exemplary embodiment of the present disclosure, a circular polarizer which is configured by a quarter wave plate (QWP) 741 and a linear polarizer 742 may be disposed on an upper surface of the organic light emitting display panel 740.

For example, when light which passes through the circular polarizer passes through the linear polarizer of the first polarizer 122a of the viewing angle control panel 720, the light may be the P-polarization.

For example, a predetermined adhesive layer 745 may be disposed between the linear polarizer 742 and the first polarizer 122a, but is not limited thereto. For example, the adhesive layer 745 may be configured by an optically clear adhesive. For reference, in the OCA, an adhesive is coated in advance on a transparent base material (for example, a polyester film) so that an object may be bonded while maintaining optical transparency.

As described above, in the seventh exemplary embodiment of the present disclosure, the organic light emitting display panel 740 is formed below the viewing angle control panel 720 in the add-on manner. Therefore, there is no air gap between the viewing angle control panel 720 and the organic light emitting display panel 740 so that the distortion due to the external force may be minimized and thus the reliability is improved.

In the meantime, according to the present disclosure, an area of the viewing angle control panel is divided to be driven in different modes, which will be described in more detail with reference to an eighth exemplary embodiment of the present disclosure.

Figure 16:
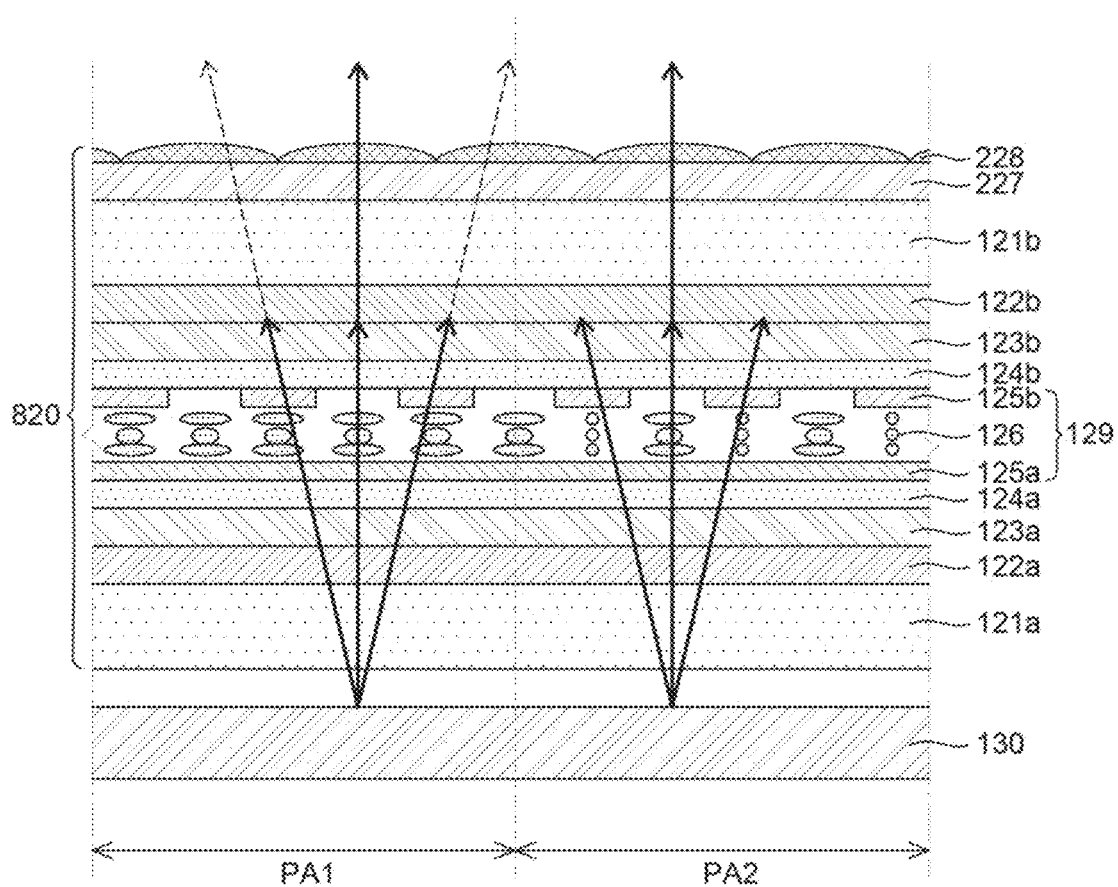
FIG. 16 is a cross-sectional view illustrating a part of a display device having a switchable viewing angle according to an eighth exemplary embodiment of the present disclosure.

FIG. 16 is a cross-sectional view illustrating a part of a display device having a switchable viewing angle according to an eighth exemplary embodiment of the present disclosure.

FIG. 16 illustrates structures of a viewing angle control panel 820 and a backlight unit 130 according to an eighth exemplary embodiment of the present disclosure. In FIG. 16, for the convenience of description, a display panel above the viewing angle control panel 820 is omitted.

FIG. 16 is configured by the substantially same configuration as the second exemplary embodiment of the present disclosure of FIGS. 5, 6A, and 6B described above except that an area of the viewing angle control panel 820 is divided to be driven in different modes. Therefore, the same configuration is denoted by the same reference numeral and a description thereof will be omitted.

Referring to FIG. 16, as described above, the display panel may be disposed above the viewing angle control panel 820 and the backlight unit 130 may be disposed therebelow.

Further, in the display device having a switchable viewing angle according to the eighth exemplary embodiment of the present disclosure, the viewing angle control panel 820 may be divided into at least one or more first areas PA1 and at least one or more second areas PA2.

For example, in the first area PA1, an electric field is not applied between the upper electrode 125b and the lower electrode 125a to be implemented in a share mode and in the second area PA2, an electric field is applied between the upper electrode 125b and the lower electrode 125a to be implemented in a privacy mode.

Accordingly, the first area PA1 may correspond to a person who requires a clear and undistorted image quality in a wide viewing angle range and the second area PA2 may correspond to a person who works with confidential documents or performs tasks requiring a security.

As described above, in the eighth exemplary embodiment of the present disclosure, as the area of the viewing angle control panel 820 is divided to be driven in different modes, many people may select a privacy mode or a share mode to provide convenience.

The exemplary embodiments of the present disclosure can also be described as follows:

According to an aspect of the present disclosure, there is provided a display device having a switchable viewing angle. The display device having a switchable viewing angle includes a first polarizer which transmits light of a P-wave or S-wave, a viewing angle control panel which is disposed above the first polarizer, includes a lower electrode and an upper electrode, and a liquid crystal layer disposed between the lower electrode and the upper electrode to selectively change the light of the P-wave or S-wave to the S-wave or P-wave and a second polarizer which is disposed above the viewing angle control panel and has a transmission axis perpendicular to a transmission axis of the first polarizer.

The display device having a switchable viewing angle may further comprise a backlight unit which is disposed below the first polarizer and provides polarized light of the P-wave or the S-wave.

The display device having a switchable viewing angle may further comprise a first tri acetate cellulose (TAC) layer disposed at an outside of the first polarizer and a second TAC layer disposed at an outside of the second polarizer.

The display device having a switchable viewing angle may further comprise a first phase delay compensation film disposed between the first polarizer and the viewing angle control layer and a second phase delay compensation film disposed between the second polarizer and the viewing angle control layer.

The display device having a switchable viewing angle may further comprise a first protective layer disposed between the first phase delay compensation film and the viewing angle control layer and a second protective layer disposed between the second phase delay compensation film and the viewing angle control layer.

The upper electrode may be configured as a plurality of bars which is parallel in one direction over an active area and the lower electrode may be configured as a whole electrode over the active area.

The upper electrode may be disposed to be parallel to a data line.

The upper electrode may be disposed to be parallel to a gate line.

The liquid crystal layer may be configured by twisted nematic liquid crystal.

In case an electric field is not applied between the upper electrode and the lower electrode, a state of the liquid crystal layer may be the same in all areas of the viewing angle control layer and in case an electric field is applied between the upper electrode and the lower electrode, the state of the liquid crystal layer may be different between an area in which the upper electrode is disposed and an area in which the upper electrode is not disposed.

In case the electric field is not applied between the upper electrode and the lower electrode, in all the areas of the viewing angle control layer, a polarization direction of the light of the P-wave which passes through the first polarizer may be changed to the S-wave or a polarization direction of the light of the S-wave may be changed to the P-wave.

In case the electric field is applied between the upper electrode and the lower electrode, in the area in which the upper electrode is not disposed, a polarization direction of the light of the P-wave which passes through the first polarizer may be changed to the S-wave or a polarization direction of the light of the S-wave may be changed to the P-wave, but in the area in which the upper electrode is disposed, the light of the P-wave or the S-wave which passes through the first polarizer may pass through the liquid crystal layer without changing a polarized state.

The display device having a switchable viewing angle may further comprise a plurality of pixel lenses disposed above the second polarizer.

A lower surface of each pixel lens may have a flat plane and an upper surface of the each pixel lens may have a semicircular shape.

A lower surface of each pixel lens may have a flat plane and an upper surface of the each pixel lens may have a trapezoidal shape.

The display device having a switchable viewing angle may further comprise a cover layer which is disposed above the plurality of pixel lenses to cover the plurality of pixel lenses.

The display device having a switchable viewing angle may further comprise a display panel disposed above the viewing angle control panel.

Each pixel area of the display panel may overlap one of the pixel lenses.

The plurality of pixel lenses may be disposed to be parallel to a data line with a regular interval and each pixel lens may be configured as a plurality of bars which is parallel to each other.

Each pixel lens may be disposed to correspond to an area between the upper electrodes.

Each pixel lens may be disposed to correspond to each of red, green, and blue color filters.

The display panel may include a first substrate, a second substrate, another liquid crystal layer disposed between the first substrate and the second substrate, a third polarizer disposed at an outside of the first substrate and a fourth polarizer which is disposed at an outside of the second substrate and has a transmission axis perpendicular to a transmission axis of the third polarizer.

The display device having a switchable viewing angle may further comprise a support substrate disposed between the viewing angle control layer and the first polarizer.

According to another aspect of the present disclosure, there is provided a display device having a switchable viewing angle. The display device having a switchable viewing angle includes a first polarizer which transmits light of a P-wave or S-wave, a viewing angle control panel which is disposed above the first polarizer, includes a lower electrode and an upper electrode, and a liquid crystal layer disposed between the lower electrode and the upper electrode to selectively change the light of the P-wave or the S-wave to the S-wave or the P-wave, a third polarizer which is disposed above the viewing angle control panel and has a transmission axis perpendicular to a transmission axis of the first polarizer, a first substrate disposed above the third polarizer, a second substrate which is opposite to the first substrate, another liquid crystal layer disposed between the first substrate and the second substrate and a fourth polarizer which is disposed at an outside of the second substrate and has a transmission axis perpendicular to a transmission axis of the third polarizer.

The display device having a switchable viewing angle may further comprise a plurality of pixel lenses disposed between the viewing angle control panel and the third polarizer.

The display device having a switchable viewing angle may further comprise a cover layer which is disposed above the plurality of pixel lenses to cover the plurality of pixel lenses.

The display device having a switchable viewing angle may further comprise an organic light emitting display panel disposed below the first polarizer and a quarter wave plate and a linear polarizer which are disposed between the first polarizer and the organic light emitting display panel to provide polarized light of the P-wave or S-wave.

The viewing angle control panel may be divided into at least one or more first areas and at least one or more second areas and in the first area, an electric field is not applied between the upper electrode and the lower electrode to implement a share mode and in the second area, the electric field is applied between the upper electrode and the lower electrode to simultaneously implement a privacy mode.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A display device having a switchable viewing angle, comprising:
    a backlight unit configured to provide polarized light of a P-wave or S-wave;
    a first polarizer which is disposed above the backlight unit and has a transmission axis that matches the polarized light of the backlight unit and transmits light of the P-wave or the S-wave;
    a viewing angle control panel above the first polarizer, the viewing angle control panel includes a lower electrode, an upper electrode, and a liquid crystal layer between the lower electrode and the upper electrode, the liquid crystal layer selectively changing the light of the P-wave to the S-wave or the S-wave to the P-wave;
    a second polarizer above the viewing angle control panel, the second polarizer having a transmission axis perpendicular to the transmission axis of the first polarizer; and
    a plurality of pixel lenses above the second polarizer,
    wherein the lower electrode includes a whole electrode and the upper electrode includes a plurality of bars that are parallel in one direction over the lower electrode and
    wherein each of the plurality of pixel lenses overlaps an area between a corresponding pair of bars from the plurality of bars of the upper electrode,
    wherein responsive to an electric field not being applied between the upper electrode and the lower electrode during a first mode, a state of the liquid crystal layer is a same in all areas of the viewing angle control panel, and
    wherein responsive to the electric field being applied between the upper electrode and the lower electrode during a second mode, the state of the liquid crystal layer is different between an area in which the upper electrode is disposed and an area in which the upper electrode is not disposed, wherein a position and a shape of the plurality of pixel lenses during the first mode is a same as a position and a shape of the plurality of pixel lenses during the second mode.

2. The display device having a switchable viewing angle according to claim 1, further comprising:
a first tri acetate cellulose (TAC) layer outside of the first polarizer; and
a second TAC layer outside of the second polarizer.

3. The display device having a switchable viewing angle according to claim 2, further comprising:
a first phase delay compensation film between the first polarizer and the viewing angle control panel; and
a second phase delay compensation film between the second polarizer and the viewing angle control panel.

4. The display device having a switchable viewing angle according to claim 3, further comprising:
a first protective layer between the first phase delay compensation film and the viewing angle control panel; and
a second protective layer between the second phase delay compensation film and the viewing angle control panel.

5. The display device having a switchable viewing angle according to claim 1, wherein responsive to the electric field not being applied between the upper electrode and the lower electrode, in all the areas of the viewing angle control panel, a polarization direction of the light of the P-wave which passes through the first polarizer is changed to the S-wave or a polarization direction of the light of the S-wave is changed to the P-wave.

6. The display device having a switchable viewing angle according to claim 1, wherein responsive to the electric field being applied between the upper electrode and the lower electrode, in the area in which the upper electrode is not disposed, a polarization direction of the light of the P-wave which passes through the first polarizer is changed to the S-wave or a polarization direction of the light of the S-wave is changed to the P-wave, but in the area in which the upper electrode is disposed, the light of the P-wave or the S-wave which passes through the first polarizer passes through the liquid crystal layer without changing a polarized state.

7. The display device having a switchable viewing angle according to claim 1, further comprising:
a display panel above the viewing angle control panel,
wherein each pixel area of the display panel overlaps one of the plurality of pixel lenses.

8. The display device having a switchable viewing angle according to claim 7, wherein the display panel includes:
a first substrate;
a second substrate;
another liquid crystal layer between the first substrate and the second substrate;
a third polarizer outside of the first substrate; and
a fourth polarizer outside of the second substrate, the fourth polarizer having a transmission axis perpendicular to a transmission axis of the third polarizer.

9. The display device having a switchable viewing angle according to claim 1, wherein the plurality of pixel lenses are parallel to a data line with a regular interval and each of the plurality of pixel lenses includes a plurality of bars which are parallel to each other.

10. The display device having a switchable viewing angle according to claim 1, wherein each of the plurality of pixel lenses corresponds to each of red, green, and blue color filters.

11. The display device having a switchable viewing angle according to claim 1, further comprising:
a support substrate between the viewing angle control panel and the first polarizer.

* * * * *